United States Patent
Brand et al.

(10) Patent No.: US 12,341,970 B2
(45) Date of Patent: Jun. 24, 2025

(54) TRIANGULATION-BASED ADAPTIVE SUBSAMPLING OF DENSE MOTION VECTOR FIELDS

(71) Applicants: HUAWEI TECHNOLOGIES CO., LTD., Shenzhen (CN); Friedrich-Alexander-Universität Erlangen-Nürnberg, Erlangen (DE)

(72) Inventors: Fabian Brand, Erlangen (DE); Jürgen Seiler, Zirndorf (DE); André Kaup, Effeltrich (CN); Elena Alexandrovna Alshina, Munich (DE); Semih Esenlik, Munich (DE)

(73) Assignees: Huawei Technologies Co., Ltd., Shenzhen (CN); Friedrich-Alexander-Universität Erlangen-Nürnberg, Erlangen (DE)

( * ) Notice: Subject to any disclaimer, the term of this patent is extended or adjusted under 35 U.S.C. 154(b) by 155 days.

(21) Appl. No.: 17/976,666

(22) Filed: Oct. 28, 2022

(65) Prior Publication Data
US 2023/0050102 A1   Feb. 16, 2023

Related U.S. Application Data

(63) Continuation of application No. PCT/EP2021/060080, filed on Apr. 19, 2021.

(30) Foreign Application Priority Data

Apr. 30, 2020  (WO) ............... PCT/EP2020/062062

(51) Int. Cl.
*H04N 19/137*   (2014.01)
*H04N 19/132*   (2014.01)
*H04N 19/167*   (2014.01)

(52) U.S. Cl.
CPC ......... *H04N 19/137* (2014.11); *H04N 19/132* (2014.11); *H04N 19/167* (2014.11)

(58) Field of Classification Search
CPC .. H04N 19/119; H04N 19/132; H04N 19/137; H04N 19/167; H04N 19/176;
(Continued)

(56) References Cited

U.S. PATENT DOCUMENTS

| 5,598,216 A | * | 1/1997 | Lee | ......... | H04N 19/54 |
| | | | | | 382/241 |
| 8,819,525 B1 | * | 8/2014 | Holmer | ......... | H04N 19/67 |
| | | | | | 714/775 |
| 2012/0014605 A1 | * | 1/2012 | Yamazoe | ......... | G06T 7/251 |
| | | | | | 382/190 |

FOREIGN PATENT DOCUMENTS

WO   2019039322 A1   2/2019

OTHER PUBLICATIONS

Dudon et al., "Shape-adaptive Triangular Mesh for Object-based Motion Estimation," International Organisation for Standardisation Organisation Internationale de Normalisation ISO/IEC JTC1/SC29/WG11 Coding of Moving Pictures and Associated Audio, ISO/IEC JTC1/SC29/WG11 MPEG96/0737, Total 12 pages (Mar. 1996).
(Continued)

*Primary Examiner* — Nathnael Aynalem
(74) *Attorney, Agent, or Firm* — Leydig, Voit & Mayer, Ltd.

(57) ABSTRACT

The present disclosure relates to an apparatus and a method for providing a plurality of motion vectors related to an image coded in a bitstream. The method includes obtaining a set of sample positions within the image, obtaining respective motion vectors associated with the set of sample positions, deriving an additional motion vector based on information coded in the bitstream, determining an additional sample position located within a triangle, which is formed
(Continued)

by three sample positions of the set of sample positions, based on the respective motion vectors associated with the three sample positions, the triangle not including the rest of the sample positions of the set of sample positions, adding the additional sample position to the set of sample positions, and associating the derived additional motion vector with the additional sample position.

20 Claims, 16 Drawing Sheets

(58) Field of Classification Search
CPC .... H04N 19/54; H04N 19/139; H04N 19/463; H04N 19/467; H04N 19/513; H04N 19/52; H04N 19/517; H04N 19/50
USPC .............................................. 375/240–240.29
See application file for complete search history.

(56) References Cited

OTHER PUBLICATIONS

Lu et al., "DVC: An End-to-end Deep Video Compression Framework," arXiv:1812.00101v3 [eess.IV], Total 14 pages (Apr. 7, 2019).

Lanz et al., "Graph-Based Compensated Wavelet Lifting for Scalable Lossless Coding of Dynamic Medical Data," IEEE Transactions on Image Processing, vol. 29, 2020, Total 13 pages, Institute of Electrical and Electronics Engineers, New York, New York (2020).

Demaret et al., "Image Compression by Linear Splines over Adaptive Triangulations," Signal Processing, vol. 86, No. 7, Total 23 pages (Jul. 2006).

Chen et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11, 15th Meeting: Gothenburg, SE, Document: JVET-O2002-v2, Total 89 pages, International Union of Telecommunication, Geneva, Switzerland (Jul. 3-12, 2019).

Liu et al., "Neural Video Compression Using Spatio-Temporal Priors," School of Electronic Science and Engineering, arXiv:1902.07383v2 [eess.IV], Total 5 pages (Feb. 21, 2019).

Wiegand et al., "Overview of the H.264/AVC Video Coding Standard," IEEE Transactions on Circuits and Systems for Video Technology, vol. 13, No. 7, Total 17 pages, Institute of Electrical and Electronics Engineers, New York, New York (Jul. 2003).

Sullivan et al., "Overview of the High Efficiency Video Coding (HEVC) Standard," IEEE Transactions on Circuits and Systems for Video Technology, vol. 22, No. 12, Total 20 pages, Institute of Electrical and Electronics Engineers, New York, New York (Dec. 2012).

Agranovsky et al., "Subsampling-Based Compression and Flow Visualization," Visualization and Data Analysis 2015, Proc. SPIE 9397, Total 14 pages (Feb. 8, 2015).

"Series H: Audiovisual and Multimedia Systems, Infrastructure of audiovisual services—Coding of moving video, Advanced video coding for generic audiovisual services," ITU-T H.264, Total 836 pages, International Union of Telecommunication, Geneva, Switzerland (Jun. 2019).

"Series H: Audiovisual and Multimedia Systems, Infrastructure of audiovisual services—Coding of moving video, High efficiency video coding," ITU-T H.265, Total 712 pages, International Union of Telecommunication, Geneva, Switzerland (Nov. 2019).

Han et al., "Video Compression With Dense Motion Fields," IEEE Transactions on Image Processing, vol. 10, No. 11, Total 8 pages, Institute of Electrical and Electronics Engineers, New York, New York (Nov. 2001).

Pathak et al., "Learning Features by Watching Objects Move," arXiv: 1612.06370v2 [cs.CV], Total 10 pages (Apr. 2017).

Weinzaepfel et al., "DeepFlow: Large displacement optical flow with deep matching," ICCV-IEEE International Conference on Computer Vision, HAL open science, Total 9 pages (Dec. 2013).

* cited by examiner

TRIANGULATION-BASED ADAPTIVE SUBSAMPLING OF DENSE MOTION VECTOR FIELDS

CROSS-REFERENCE TO RELATED APPLICATIONS

This application is a continuation of International Application No. PCT/EP2021/060080, filed on Apr. 19, 2021, which claims priority to International Patent Application No. PCT/EP2020/062062, filed on Apr. 30, 2020. The disclosures of the aforementioned applications are hereby incorporated by reference in their entireties.

FIELD

The present disclosure relates to triangulation-based adaptive subsampling of dense motion vector fields.

BACKGROUND

Video encoders usually apply motion estimation and compensation for inter-frame prediction to exploit temporal redundancy. The motion vectors describe how the pixels of a reference frame have to be shifted in order to obtain a prediction for the pixels of a current frame. This is typically performed in a block-based manner, which assigns the same motion vector to each pixel of a block.

FIG. 1 illustrates such prediction of the current frame at the time point t. A current block 10 in the current frame is predicted by a prediction block 12 of the reference frame at a time point t-1, which is on a position that differs from the position of a co-located block 11. The co-located block 11 is a block with a location within the reference frame being the same as the location of the current block within the current frame. The arrow representing movement from the location of the co-located block to the location of the prediction block 12 is the motion vector. The motion vector may be conveyed from the encoder to the decoder as side information.

In order to make such prediction scalable, hierarchic block splitting is applied, as shown in FIG. 2. In FIG. 2, a raster of pixels (samples) is shown alongside with a block of 8×8 samples split into three 4×4 sub-blocks and four 2×2 sub-blocks. For each sub-block, a motion estimation is performed and a respective motion vector is obtained as illustrated by the corresponding arrows indicating direction of the movement with respect to the reference frame. The motion vectors are typically signaled within the bitstream of the encoded video; either directly or encoded differentially. In some codecs, implicit derivation of the motion vectors is applied, the derivation being performed based on the reconstructed decoded image on both side encoder and decoder.

By hierarchic block splitting, video codecs perform implicit sub-sampling by using block-based motion estimation and compensation. Modern codecs like high efficiency video coding (HEVC) or versatile video coding (VVC), in a way, use content adaptive sampling by using different block sizes. These codecs explicitly signal the block splits as a quad-tree and ternary tree. It is established, that the increasingly adaptive splitting is responsible for large gains in coding efficiency of the respective codecs.

However, these procedures are often inaccurate and produce blocking artifacts, as long as the number of motion vectors to be transmitted is small.

SUMMARY

The present disclosure relates to methods and apparatuses for providing motion vectors.

In particular, embodiments of the present disclosure provide an efficient way of deriving positions associated with motion vectors.

According to an aspect, an apparatus is provided for providing a plurality of motion vectors related to an image coded in a bitstream, comprising processing circuitry configured to: obtain a set of sample positions within the image, and obtain respective motion vectors associated with the set of sample positions, derive an additional motion vector based on information coded in the bitstream, determine an additional sample position located within a triangle, which is formed by three sample positions of the set of sample positions, based on the respective motion vectors associated with the three sample positions, the triangle not including any other sample position of the set, add the additional sample position to the set of sample positions, and associate the derived additional motion vector with the additional sample position.

This apparatus may be used at encoder side and/or at decoder side, as well as for other purposes as image encoding or decoding.

The present disclosure may be considered to combine advantages of adaptive sampling with low or no position signaling cost of regular sampling. Progressive transmission of motion vectors may be possible. In particular, new sample positions are found based on already available positions and motion vectors. The positions do not need to be transmitted but are rather determined based on triangulation.

The processing circuitry may be configured to select, from the set, the three sample positions for determining the additional sample position according to the three motion vectors.

Selection of sample positions enables content-adaptive sampling, so that parts of the content with homogenous motion field is less densely sampled than the parts of the content (image) with non-homogeneous motion field.

In particular, the selecting comprises: obtaining non-overlapping triangles, wherein each sample position of the set corresponds to at least one of the non-overlapping triangles; computing, for each of the obtained non-overlapping triangles, a value indicative of a dissimilarity between three motion vectors, which are associated with three respective sample positions of the set and form the triangle; selecting, the three sample positions for determining the additional sample position, according to the computed values.

Dissimilarity metric is a simple mean to distinguish which parts of the image should be coded with a more or less dense motion vector positions. In other words the dissimilarity metric is used to distinguish regions in a picture where the sampling of the motion vector field is denser compared than other regions.

The apparatus may further comprise: determining T triangles for which the computed value indicates a highest dissimilarity among the values computed for the obtained non-overlapping triangles, parameter T being an integer larger than zero; and, for each triangle of the T triangles, performing the determining, the adding and the associating.

Selection of only T triangles in each iteration provides for an efficient complexity control.

In an exemplary implementation, the parameter T depends on an amount of sample positions in the set. The more sample positions are in the set, the larger may be T. Such determination of T enables identifying a plurality of image portions, which are to be sampled more densely. This enables more flexibility in following the motion of the content.

In an embodiment, the processing circuitry is configured to perform a plurality, N, of steps, with N being an integer larger than one, wherein each step k, with k being an integer, includes: obtaining a k-th set of sample positions within the image, and obtain respective motion vectors associated with the k-th set of sample positions, derive one or more additional motion vectors from an information coded in the bitstream, form a (k+1)-th set by: determining one or more additional sample positions, each located within a respective triangle, which is formed by three sample positions of the k-th set of sample positions, according to the motion vectors associated with the respective three sample positions, the triangle not including any other sample position of the (k-th) set, adding the one or more additional sample positions to the k-th set of sample positions thereby forming (k+1)-th set, and associating the derived additional motion vectors with the respective additional sample positions.

Iterative computation introduces scalability which enables meeting the tradeoff between the quality and the computational complexity or speed desired by a particular application. Moreover, iterative provision of motion vectors and their associated sample positions enables for scalable and progressive video.

For instance, the number, N, of steps is predefined and/or determined according to a predefined rule. Number N might be determined according to number of motion vectors derived from the bitstream.

The processing circuitry may be configured to obtain the 1st set by initializing the 1st set to include sample positions given by a predefined grid within the image. This approach enables to completely dispose of signaling positions. Not even the initial positions need to be signaled, if they are locates on a predefined grid known to the encoder as well as to the decoder.

For example, the obtaining non-overlapping triangles is performed by Delaunay triangulation. This approach provides for compact triangles, avoiding lengthy shapes.

The value for a triangle is computed as a function of: an estimated variance of at least one component of the motion vectors associated with the three sample positions forming the triangle, and/or an estimated variance of the motion vectors associated with the three sample positions forming the triangle, and/or a size of the triangle. Variance is an efficient measure reflecting dissimilarity.

The processing circuitry may be configured to derive the additional motion vector by applying at least one of: dequantization, back transformation, and prediction. Deriving motion vectors in these ways may provide for a more efficient bitstream (with smaller rate) compared to direct signaling of motion vectors.

For example, the additional sample position is located in a center of mass of the triangle. Center of mass of a triangle is not complicated to calculate.

In an embodiment, the processing circuitry is configured to derive, from the bitstream, the value of the number of steps N. Signaling N provides for additional quality parameter which controls motion reconstruction quality possibly independently from the quantization parameter.

Alternatively or in addition, the processing circuitry is configured to reconstruct optical flow for sample positions within the image, which do not belong to the set, based on the sample positions of the set. Accordingly, the signaling of the motion related parameters is more efficient while still sufficiently accurate.

Alternatively or in addition, the processing circuitry is configured to: derive an optical flow for the image, based on the image and based on a reference image preceding or following the image in displaying order, derive information to be coded in the bitstream based on the derived optical flow, and encode the information into the bitstream. The subsampling of the optical flow is an efficient way to find appropriate sample positions and motion vectors.

According to an aspect, a video decoder is provided comprising: the apparatus as described above for providing motion vectors for an image in the bitstream, circuitry applying a motion compensation according to the provided motion vectors to predict the image, circuitry for reconstructing the image based on the predicted image.

According to an aspect, a video encoder is provided comprising: the apparatus as described above for providing motion vectors for an image in the bitstream, encoding circuitry for encoding the image based on the estimated motion vectors and for encoding information for deriving the estimated motion vectors, a generating circuitry for generating the bitstream including the encoded image and the encoded information.

According to a further aspect of the disclosure, a method is provided for providing a plurality of motion vectors related to an image coded in a bitstream, comprising the steps of: obtaining a set of sample positions within the image, and obtaining respective motion vectors associated with the set of sample positions, deriving an additional motion vector based on information coded in the bitstream, determining an additional sample position located within a triangle, which is formed by three sample positions of the set of sample positions, based on the respective motion vectors associated with the three sample positions, the triangle not including any other sample position of the set, adding the additional sample position to the set of sample positions, and associating the derived additional motion vector with the additional sample position.

Moreover, methods corresponding to the steps performed by the processing circuitry as described above, are also provided.

According to an aspect, a computer product is provided comprising a program code for performing the method mentioned above. The computer product may be provided on a non-transitory medium and include instructions which when executed on one or more processors perform the steps on the method.

The above mentioned apparatuses may be embodied on an integrated chip.

Any of the above mentioned embodiments and exemplary implementations may be combined.

BRIEF DESCRIPTION OF THE DRAWINGS

In the following embodiments of the disclosure are described in more detail with reference to the attached figures and drawings, in which.

DETAILED DESCRIPTION

Figure 1:
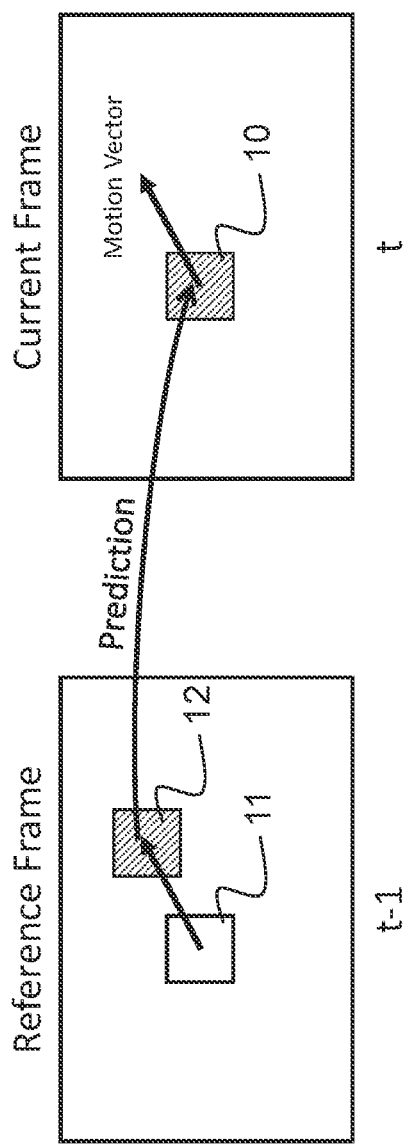
FIG. 1 is a schematic drawing illustrating motion estimation and motion prediction.

In the following, an overview over some of the used technical terms is provided.

However, since the dense motion field contains as many motion vectors as the image has samples (e.g., pixels), it is not feasible to transmit the whole field, since the motion field contains more information than the image itself. Therefore, the dense motion field has to be sub-sampled, quantized, and encoded into the bitstream to be transmitted. The decoder then interpolates the missing motion vectors and uses the reconstructed dense motion field for motion compensation. The reconstruction of the (dense) optical flow means reconstructing motion vectors for sample positions within the image, which do not belong to the set of sample positions associated with motion vectors indicated in the bitstream, based on the sample positions of the set.

In the sub-sampling process, there are two possibilities.

The field can be sub-sampled in a regular pattern, which is independent of the content. A regular sampling pattern is a grid pattern with regularly spaced distances. Since the number of pixels might not be an integer multiple of the number of sampling points per line, the distances between the sampling points may vary by one pixel. This will result in many sampling points, which are placed at suboptimal positions. Areas with uniform motion, where only few motion vectors are needed, contain the same number of motion vectors per unit area as areas with diverse motion, where many sampling points are needed. The former results in a bit rate which is larger than necessary, the latter in an insufficient prediction quality since more motion vectors are needed.

The other possibility is to transmit the motion vectors corresponding only to those positions, which are needed for a good reconstruction of the flow field. That way, areas with uniform motion do not need much rate and areas with complex motion are sampled sufficiently

| | |
|---|---|
| Motion Vector | 2D-vector that specifies the spatial distance of two corresponding points in two different frames, usually denoted as $v = [v_x, v_y]$. Motion vector may be a 3D-vector and, in addition, include a reference picture refPict, which may be considered as a time-domain coordinate. |
| Coordinate | Position of a pixel or motion vector origin. Denoted as $p = [x, y]$. |
| Motion Field | Set of $\{p, v\}$pairs. Denoted as M. |
| Dense Motion Field | Motion field, which covers every pixel of an image. Here, p is redundant if the dimensions of the image are known, since the motion vectors can be ordered in line-scan order or another predefined order. |
| Sparse Motion Field | Motion field that does not cover all pixels. Here, knowing p is necessary. |
| Current Frame | To-be-encoded frame, which is predicted. |
| Reference Frame | Frame that is used for prediction, i.e., a frame of which samples are used to predict samples of the current frame. |
| Motion Compensation | Generating a predicted image using a reference image and motion information (motion vector including vertical and horizontal coordinate and, possibly, also time coordinate (reference to a reference picture)). |
| Inter-Prediction | Prediction in video coding in which motion information is signaled to the decoder such that it can generate a predicted image using previously decoded frames. |
| Subsampling of a motion field | Selecting a number of sample point from a motion field. |
| Non-Adaptive Subsampling | Performing subsampling independently from the content, e.g., by using a fixed pattern. |
| Adaptive Subsampling | Perform subsampling in way that depends on the to-be-sampled motion field, such that certain conditions are met, e.g., sampling areas with complex motion more densely, or the like |

Newer optical flow algorithms generate a dense motion field. This motion field consists of many motion vectors, one for each pixel in the image. Using this motion field for prediction usually yields a much better prediction quality.

dense. However, since only the encoder knows the whole motion field, the positions have to be signaled in some way. Signaling of the positions reduces the efficiency of the coding because it requires additional rate.

In other words, as opposed to the sampling of the motion vector with a regular pattern, the motion field is sampled at positions that are not predefined, and the coordinates of the sampling positions need to be transmitted to decoder.

In the above description the term "rate", or equivalently bitrate relates to the side information that needs to be transmitted from encoder to decoder for reconstruction of video. Usually more the side information necessary for reconstruction of a video, higher the necessary bitrate.

The present disclosure provides an approach which may reduce disadvantages of both above-mentioned options. In particular, an encoder is able to transmit motion vectors mostly at those positions which are needed for good reconstruction without having to transmit their positions explicitly. Furthermore, the motion field can be transmitted in a progressive and scalable way. This means, that the transmission can be stopped after any transmitted motion vector and the motion field can then be reconstructed with a lower quality (meaning with a lower resolution).

A dense motion field between two natural images contains areas with different significance of content, which have to be sampled in different ways.

Areas with uniform motion only need very few sampling points, since the intermediate motion vectors can be interpolated easily. This is caused by the fact that most of the motion vectors have the same orientation and size.

Borders between two areas with uniform but different motion have to be sampled densely along the border line to assure the motion vector interpolation on both sides of the border is correct.

Areas with complex (e.g., non-affine) motion have to be sampled densely.

The present disclosure provides some approaches to construct such adaptive sampling pattern in a way that the above mentioned significance of content is taken into account, while at the same time, avoiding the need to transmit the individual sampling positions.

In some embodiments of the present disclosure, it is possible to start from a very coarse initial sampling pattern, which may be signaled or predefined, and then to iteratively derive new sampling points using only the sparse motion field already known to the decoder. The derivation of the sampling points is achieved using triangulation. That way, the decoder can construct the same sampling positions and interpolate the motion field from the received motion vectors only, without additional side information on the respective starting positions of the motion vectors, i.e., the positions with which the motion vectors are associated.

In particular, in an embodiment, iterative subsampling is performed such that areas with complex or inhomogeneous motion are sampled more densely, by iteratively adding sampling points within certain triangles in the triangulation of the previously derived points. In each iteration, the new points are selected based only on information known to both the encoder and the decoder such that the decoder can reproduce the same sampling pattern and assign the vectors to the correct positions without explicitly signaling them.

According to an embodiment, a method is provided for providing a plurality of motion vectors related to an image coded in a bitstream. The method comprises several steps which may be implemented, e.g., by a hardware circuitry, possibly with combination of a software. The circuitry may include one or more processors or pieces of hardware, such as a general-purpose processor, a specific purpose processor—e.g., a digital signal processor, programmable hardware such as field-programmable gate arrays (FPGAs) and/or hardware for specific functions such as application-specific integrated circuit (ASIC).

Figure 3:
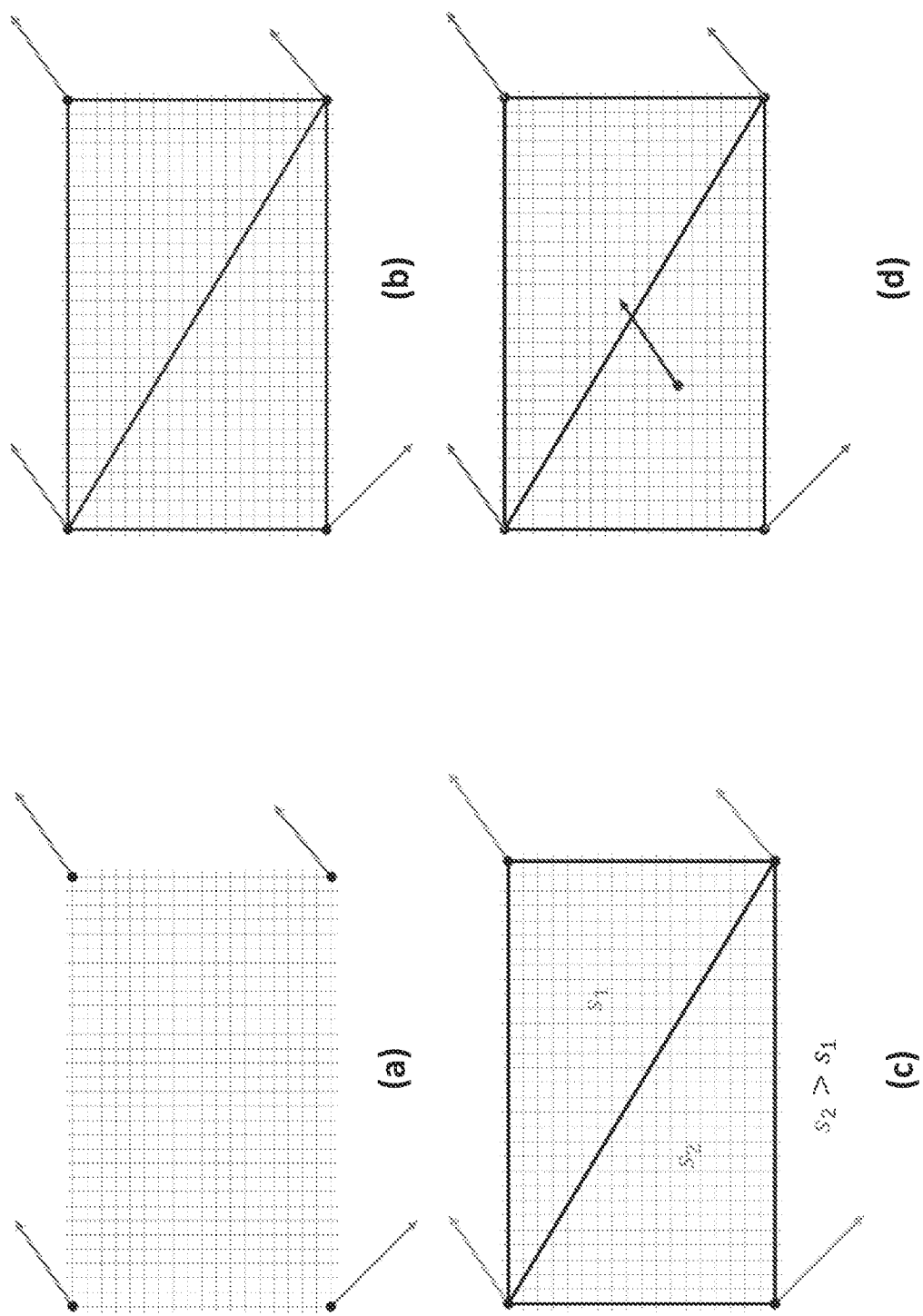
FIG. 3 is a schematic drawing illustrating a first iteration of a sample position determination.

FIG. 3 is a schematic drawing illustrating intermediate results of the method. The method can be performed at both encoder side and decoder side. The steps of the method include obtaining a set of sample positions within the image, and obtaining respective motion vectors associated with the set of sample positions. Herein, the set of the sample positions corresponds to the positions for which motion vector is available. These positions may be some initially defined positions, for example some default positions or positions which are determined by an encoder and signaled in the bitstream. However, the positions may also be positions obtained in previous iterations.

FIG. 3 shows in part (a) a sample grid in which each small square illustrates a sample position. Four sample positions at the outer corners of the grid are associated with respective four motion vectors which are illustrated in the figure as arrow pointing into the directions of the motion detected for the respective four sample points (relative motion of the samples in the four sample positions between the current frame and the reference frame). These four sample positions and motion vector may correspond to the above mentioned obtained set of sample positions and motion vectors associated with them. In this example, the four positions are located on a predefined potions of the grid, known at both encoder and the decoder. The initial four motion vectors are signaled within the bitstream.

In general, the obtaining of the motion vectors and their positions at the encoder side may be performed in various different ways. For example, the encoder may calculate the complete optical flow and thus have the dense motion vector field at its disposition. The positions for which motion vectors are to be signaled may then be derived by motion field subsampling of the dense motion vector field. Another option is to proceed in the same way as at the decoder, i.e., proceed iteratively by only adding positions and motion vectors when required based on a predetermined rule, e.g., by a predetermined stop condition. At the decoder, the motion vectors are obtained based on the bitstream and associated with the obtained positions. Such association is possible for example, when the encoder and the decoder derive the positions in the same order and the bitstream has a known syntax and semantics to obtain the motion vectors. However, the encoder and the decoder do not have to apply the same order, it is enough when the order is known to both so that the association applied by the encoder and the decoder can be mapped one on another based on a pre-defined rule.

Further steps of the method include deriving an additional motion vector based on information coded in the bitstream, and determining an additional sample position located within a triangle, which is formed by three sample positions of the set of sample positions, based on the respective motion vectors associated with the three sample positions, the triangle not including any other sample position of the set. As next steps, adding the additional sample position to the set of sample positions, and associating the derived additional motion vector with the additional sample position. In other words, based on the motion characteristics of the motion of the obtained sample positions, it is determined to add (or not to add) additional position. When an additional sample position is added, an additional motion vector is associated with that additional sample position.

At the encoder, the additional motion vector is obtained based on information related to location of the sample position in the reference picture. Such information is then indicated (not necessarily explicitly coded) in the bitstream to enable the decoder a reconstruction. In particular, the additional motion vector may be obtained, for example by subsampling a dense motion field. The dense motion vector field indicates positions of each sample position of the current image on the reference image by means of the corresponding motion vector. However, the additional motion vector may be derived in another way, for example by performing pattern matching for the additional sample position in the reference picture with some template including the sample at the additional sample position and possibly some adjacent samples. In general, the present disclosure is not limited to any particular way of obtaining the motion vectors at the encoder side. The advantageous effect of reducing overhead of signaling non-regularly spaced motion vectors from the encoder to the decoder is achieved by the derivation of the sample positions at both the encoder and the decoder and may work irrespectively of the particular way in which the encoder side determines the motion vectors.

In the present disclosure, reference is made to a reference picture. The term reference picture here denotes the picture used for prediction of the current picture for which the prediction is computed. In a most simple case, the reference picture is the closest preceding picture in the decoding order. It is noted that the decoding order of pictures is not necessarily the same as the displaying order of pictures of the video. However, the reference picture may be, in principle, any picture of the video sequence. For example, with higher applicable frame rates, there may be many pictures correlated with each other, so that in some cases (parts of the current image), further pictures may provide a more similar reference. Moreover, there may be two or more reference pictures used for the prediction of a single sample position of the current picture.

The method may further comprise a step of selecting, from the set of sample positions, the three sample positions for determining the additional sample position according to the three motion vectors. In other words, given the obtained sample position set, it is selected within which three neighboring sample positions a new sample position is to be added. The provision of a selection mechanism enables to only select some of the triangles for adding new points. In other words, the sampling may be performed in more iterations for some image regions (triangles) than for other image regions (triangles).

In an embodiment, the selecting comprises: obtaining non-overlapping triangles, wherein each sample position of o the set corresponds to at least one of the non-overlapping triangles. In FIG. 3, part (b), triangles formed by the four obtained sample positions are identified. In the example shown in the figure, the triangles are separated by the main diagonal. However, in general, the triangles may also be formed to be separated by the antidiagonal. This may be fixed by a convention (e.g., always main diagonal) or selected based on a predefined rule such as minimizing dissimilarity of motion vectors of each triangle.

The selecting may further comprise computing, for each of the obtained non-overlapping triangles, a value indicative of a dissimilarity between three motion vectors, which are associated with three respective sample positions of the set and form the triangle. In other words, once the triangles are identified, a triangle is selected into which an additional sample position is to be added. In order to do so, a score function s may be computed for each triangle, being measure of dissimilarity of the three motion vectors associated with the sample positions forming the triangle. For example, the upper triangle has a score s1 and the lower triangle has a score s2. As can be seen in FIG. 3 (b), the motion vectors of the upper triangle are more homogenous than the motion vectors of the lower triangle, which results in s2>s1. This is represented in FIG. 3, part (c). Then the selecting the three sample positions is performed (for determining the additional sample position), according to the computed values, as illustrated in FIG. 3, part (d).

In one example the score function might consider the dissimilarity between only 2 of the motion vectors associated with the 2 corners of the triangle. Firstly 2 of the 3 motion vectors (corresponding to 3 corners of the triangle) are selected according to a predefined rule, and the score function is computed as according to the selected 2 motion vectors. In this example the computational complexity of calculating the dissimilarity metric is reduced, since only 2 motion vectors need to be considered instead of 3 in the above example.

The example illustrated in FIG. 3 is simplified, since there are only two triangles and only one of two triangles was selected to include further sample position (also referred to as point or sample point). In general, there may be more than two triangles and there may be more than one triangle selected. In one exemplary implementation, the selection of triangles into which new points are added is performed based on a parameter T. Such approach includes the determining of T triangles for which the computed value indicates a highest dissimilarity among the values computed for the obtained non-overlapping triangles, parameter T being an integer larger than zero. Following the determining, the approach includes, for each triangle of the T triangles, performing the determining, the adding and the associating.

However, the determination of the triangles for adding new points is not necessarily based on the parameter T. Rather, the present disclosure provides for any other possible selection. For example, there may be a threshold Thr on the score value, defined beforehand. When a score of a triangle exceeds threshold Thr, then the triangle is added a new sample position. If the score of the triangle does not exceed the threshold Thr, no new point is added to that triangle. Combinations of the parameter T and a threshold Thr are possible, as well as further selection criteria.

In another example the determination of the triangles for adding new points is based on an indication that is obtained from the bitstream. An indication corresponding to a triangle might be included (or obtained from) a bitstream to indicate whether the new sample position is added to that triangle.

It might also be possible to combine the methods of determining triangles for adding new points. For example corresponding to a triangle a score value might be calculated first and compared with a threshold value Thr. If the score value exceeds the Thr, an indicator might be obtained from (or included in) a bitstream to indicate if a new sampling point is added within the triangle. On the other hand if the score value does not exceed the Thr, no new sampling point is added within the triangle.

This approach may provide a tradeoff between signaling overhead and quality improvement. Even if the threshold Thr is exceeded, a new sample point is added into the triangle only if an indicator in the bitstream indicates that a point is to be added. The indicator may have a bit for each triangle with the score exceeding the Thr. No such indicator is included when the threshold is not exceeded.

It is noted that when referring herein to sample positions or points, there may be limited to integer values in some implementations. However, implementations are possible which may provide higher accuracy, in which the sample positions have non-integer values. The resolution may be configurable and provided as a parameter of the codec. For example, sample positions for which a sample value is available in the current image, i.e., image to be coded, are integer sample positions. There positions may correspond to non-integer sample positions in the reference picture. As is known from the current block based codecs, non-integer samples may be obtained by interpolation of the samples on fractional positions from the samples on the integer positions, e.g., using bilinear filter or any other interpolation filter.

In the above-mentioned examples, the motion vectors are sampled only in an integer grid in the current frame. However, it is possible to sample the sample positions also on a floating point grid (fractional sample positions). Such sampling interpolates the motion vectors from the dense motion field.

The above mentioned parameter T does not have to be the same for the entire video or even image, or for each iteration. In an exemplary implementation, the parameter T depends on an amount of sample positions in the set. It is noted that the above-mentioned threshold Thr may also depend on the number of the sample positions in the set. However, the present disclosure is not limited to any particular determination of parameters T and/or Thr. They may be set fixedly, signaled in a bitstream, derived from other coding parameters, or the like.

Figure 4:
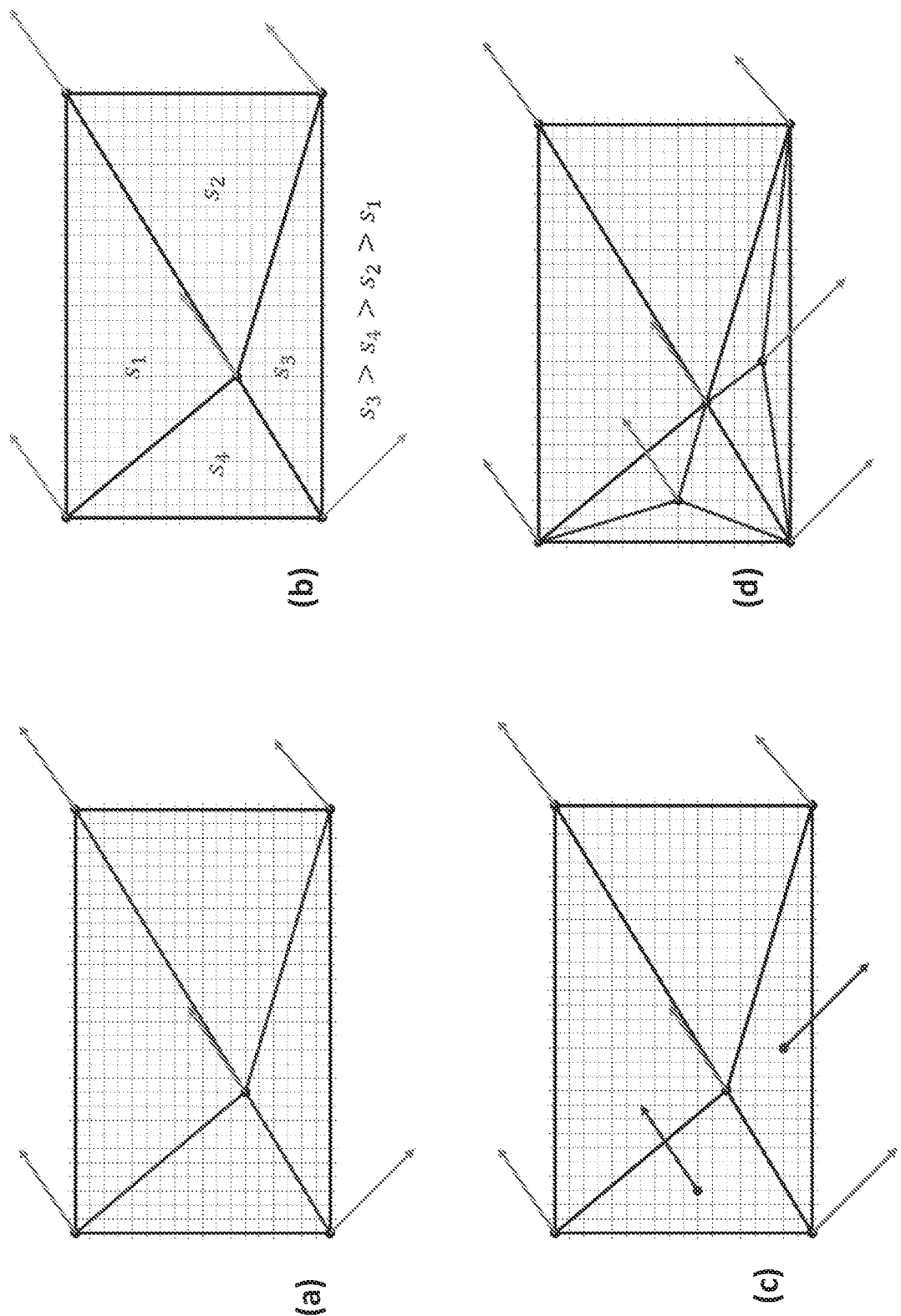
FIG. 4 is a schematic drawing illustrating a second iteration of a sample position determination.

As shown in FIG. 3, parts (a) to (d), the addition of the one or more new points into the obtained set of points may be based on or at least start with a predefined set of points, e.g., the four points shown in part (a). However, the above-mentioned method for adding new points may also be iteratively repeated. This is illustrated in FIG. 4, parts (a) to (d). In the example of FIG. 4, the determination of the points to be newly added starts from the set of points determined in a previous iteration, here the iteration described with reference to FIG. 3. In other words, the obtained set of sample positions is the set of five points shown in FIG. 3, part (d).

In general, the method can perform a plurality, N, of steps, with N being an integer larger than one, wherein each step k, with k being an integer, includes
  I. obtaining a k-th set of sample positions within the image, and obtain respective motion vectors associated with the k-th set of sample positions.
    For example, referring to FIG. 3, for k=1 the first set of sample positions is the set of four points in part (a) associated with the respective motion vectors. Referring to FIG. 4, for k=2 the second set of sample positions is the set of five points in part (a), corresponding to the five points obtained in FIG. 3, part (d). In other words, FIG. 3 shows a first iteration step, whereas FIG. 4 shows a second iteration step.
  II. derive one or more additional motion vectors. This may be based on the information included in the bitstream. As mentioned above, the motion vectors may be derived at the encoder and the decoder based on information related to shift of the samples on the sample positions of the set between the current image and a reference image. Such information is shared between the encoder and decoder by means of the bitstream. In principle, the derivation of the motion vectors is not essential for the present disclosure which is concerned mainly with deriving the (starting) positions for the motion vectors.
  III. forming a (k+1)-th set by:
    determining one or more additional sample positions, each located within a respective triangle, which is formed by three sample positions of the k-th set of sample positions, according to the motion vectors associated with the respective three sample positions, the triangle not including any other sample position of the (k-th) set,
    adding the one or more additional sample positions to the k-th set of sample positions thereby forming (k+1)-th set, and associating the derived additional motion vectors with the respective additional sample positions.

In FIG. 3, the (k+1)-th set is the second set corresponding to the five points including the four initial points of part (a) and the newly added point shown in part (d). In FIG. 4, part (a) shows determination of triangles based on the five points of FIG. 3, part (d). FIG. 4, part (b) shows scores s1, s2, s3, s4 calculated for each of the determined four triangles. It is assumed that s3>s4>s2>s1. As can be seen in part (b), the bottom left motion vector has a different direction than the rest of the motion vectors, which are substantially homogeneous. Consequently, two new points are added only to the two respective triangles which have on their corner the bottom left motion vector. This is illustrated in FIG. 4, part (c), where new points are added and associated with the corresponding motion vectors. FIG. 4, part (d) shows the new triangles formed by the set of points now also including the two new points. When referring to the triangle not including any other sample position of the (k-th) set, what is meant is that the triangles do not overlap, or that the triangles are formed by neighboring points. This can be referred to as a triangulation of the image or a portion of an image, based on its motion characteristics.

In a particular exemplary implementation, the triangulation corresponds to connecting the coordinates (sample positions) of a motion field with straight lines, forming triangles in a way that each point is connected, no lines are allowed to cross, and the union of all triangles is the convex hull of all points. Therefore, the triangulation does not contain any holes and the outer margin equals the underlying image. However, it is noted that the triangulation, in general, does not have to cover the entire image. Rather, it may be applied to only a part of the image. Moreover, the present disclosure is not limited to covering the image or the part of image by a plurality of triangles. Rather, depending on the content, the approach of the present disclosure may result in identifying (selecting) a single triangle to which an additional sample position is added.

Special case of triangulation (or, more generally, adding a point into a triangle) that maximizes the smallest angle of each triangle is Delaunay approach. This results in compact triangles.

It is noted that the iterative derivation of the sample position may be used for scalable video coding or progressive video coding. In particular, the motion vectors associated with sample positions which are added in one or more iterations may be transmitted separately (e.g., in separate packets or separate parts of the bitstream). The receivers may choose to decode only motion vectors up to a certain iteration lower than the total number of iterations necessary to assign all motion vectors carried in the bitstream. In this way, a quality scalable video is provided. Moreover, the iterative derivation of the sample positions may be used in progressive coding, so that each iteration results in image improvement.

Figure 5:
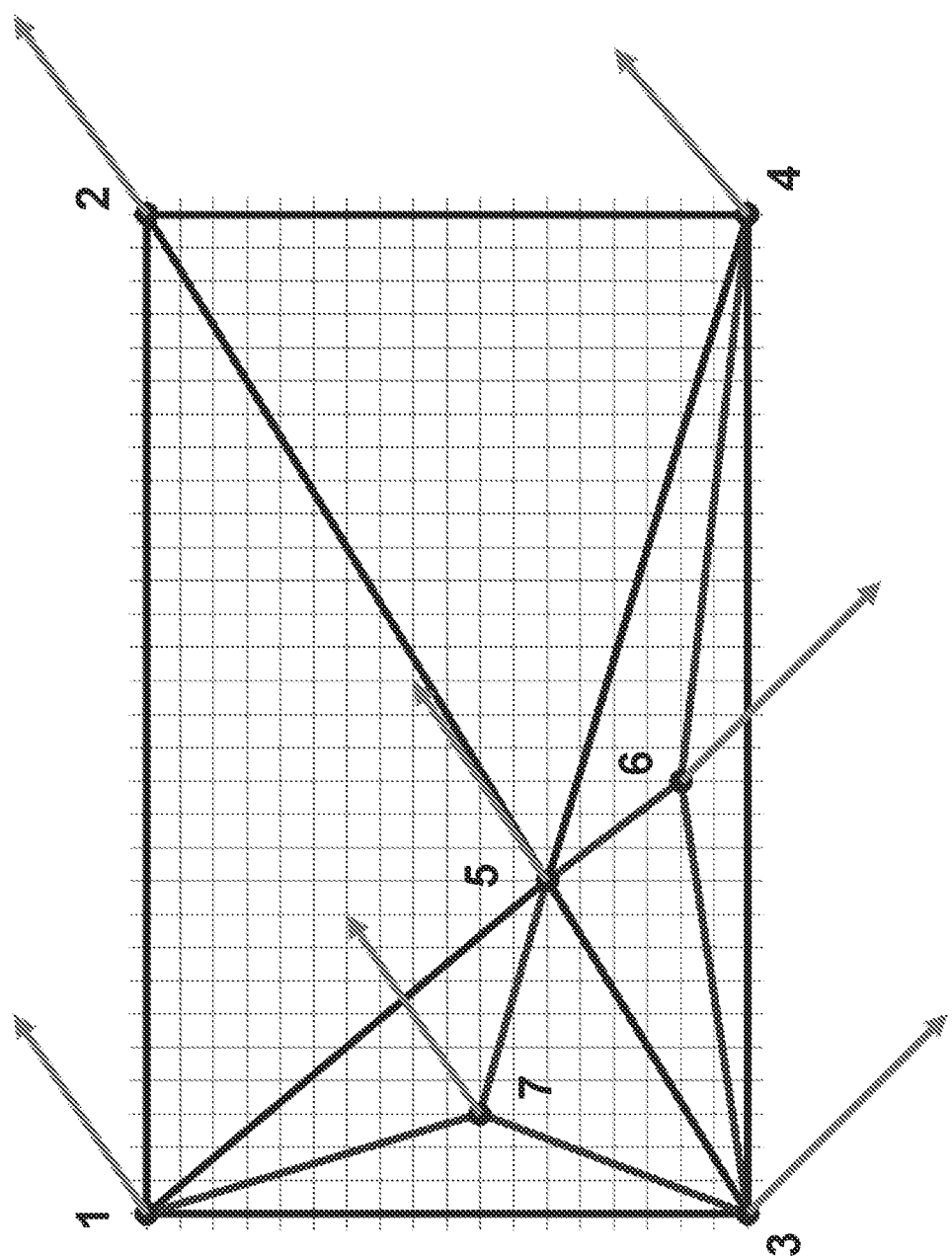
FIG. 5 is a schematic drawing illustrating ordering of the sample positions for determining the ordering of the motion vector related information in the bitstream.

FIG. 5 shows the result of the triangulation. At each sample position of the third set (after the two iteration steps described in FIGS. 3 and 4), a unique number is provided according to a predefined rule. As a matter of example, the rule here is, in the first iteration, the sample points or the initial set are numbered from left to right and from top to bottom. In each following iteration, the new points are assigned numbers based on the score of the triangle in which they were added, starting from the highest score and descending. However, other rules are possible. Numbering the sample positions enables unique association with the motion vectors. For example, the encoder derives the numbering and inserts the motion vectors of the sample positions into the bitstream in the order of the numbering. Correspondingly, the decoder derives the numbering with each iteration and parses the motion vectors accordingly, from the bitstream.

As mentioned above, it is not necessary to include the motion vector explicitly into the bitstream. There may be different mechanisms on how to derive the motion vectors based on the information which is included in the bitstream (by the encoder, parsed by the decoder). The motion vectors may be coded differentially, the motion vectors may be indicated by a reference to other motion vector(s) already encoded in/decoded from the bitstream (e.g., a list of candidates), or the like.

Regarding the number of iterations, N, it is advantageous if there is a stop rule. It is noted that in principle no stop rule is necessary, the triangulation may be performed until the triangles have their corners corresponding to two neighboring integer pixel positions, so that there is no further integer pixel position between them. However, for some applications, a stop criteria may be desirable. In an exemplary implementation, the number, N, of steps is predefined and/or determined according to a predefined rule. For example, N may be defined before the encoding by a user based on the desired image quality, i.e., motion resolution. At the decoder, it is then possible to derive, from the bitstream, the value of the number of steps N. Alternatively, N is determined based on the resolution of the image, e.g., based on the size of the image in terms of its horizontal and vertical number of integer samples. The particular rule for assigning to certain resolution of the image a certain N may be defined in standard in a table or as a computation rule. Other stop criteria in addition to or alternatively to the number of iterations may be applied. For example, the iterations may stop when the dissimilarity of the motion vectors in each triangle is below a certain threshold, it is possible to use rate-control by coding all current motion vectors and stopping when a desired rate is reached. Other convergence criteria are possible.

It is possible to obtain the 1st set (k=1) by initializing the 1st set to include sample positions given by a predefined grid within the image. This was shown in FIG. 3, part (a), by starting with the four sample positions corresponding to the corners of a rectangle. The rectangle may be only a part of an image. In fact, it is possible to divide an image into regular rectangles or squares and to perform triangulation for each of them. It is also possible to start with four corners of the image. It is possible to derive the starting set of sample positions by triangulation. In other words, the present disclosure is not limited to any particular initial set or to performing iterations. It is possible to employ only a single iteration, which then represent an image enhancement, e.g., for scalable or progressive coding.

Alternatively, a content adaptive initial sampling may be applied. In this approach, an initial sampling pattern is generated, which assures that each object contains at least one motion vector. There are several ways to achieve this. For example, the flow field at the encoder is clustered, and one point from each cluster is selected and explicitly transmitted to the decoder (i.e., provided within the bitstream). According to another example, image segmentation is performed on the reference image (which is known at the encoder as well as decoder) and assures (e.g., as a constraint) that each segment is covered by at least one sampling point. This procedure can run on encoder and decoder side, so no side information is necessary.

Moreover, the initial sampling does not have to follow the objects. Rather, convergence for differently spaced initial sampling is tested and the best spacing is signaled. Since the density itself is of less importance compared to the actual positions of the sampling points, this can improve the results. In this approach, the number of initial samples (K) may be predefined or also a part of testing (optimization) and signaled within the bitstream.

The score function applied in the selection of the triangles (and possibly in ordering the sample positions and their corresponding motion vectors) should reflect the amount of homogeneity or non-homogeneity of the motion vectors. In particular, the value (score) for a triangle is computed as a function of:

i) an estimated variance of at least one component (e.g., x, y) of the motion vectors associated with the three sample positions forming the triangle, and/or ii) an estimated variance of the motion vectors associated with the three sample positions forming the triangle, and/or iii) a size of the triangle.

Estimated variance is a variance calculated based on the three motion vectors, for instance a sample variance, sometimes also simply referred to as variance in the context of deterministic signal processing.

In the following, a detailed example of the above mentioned approach is provided. In Table 1, parameters are listed, which when known at both encoder side and decoder side, provide information sufficient to derive motion vectors only on sample positions necessary for an exemplary quality (resolution). These parameters can be fixed (e.g., defined in a standard) or transmitted as side-information (e.g., conveyed within the bitstream related to the coded current image). A stop criterion for defining the iteration depth may be defined at the encoder but does not have to be transmitted, as it can be either defined in the same manner at the decoder, or derived from the information regarding motion vectors (e.g., number of motion vectors signaled). However, the present disclosure is not limited to any particular stop criteria and its signaling. The signaling may also be performed explicitly.

TABLE 1

Exemplary parameters known at an encoder and a decoder.

| Parameter | Description |
| --- | --- |
| K | Number of initially transmitted motion vectors. |
| T | Number of motion vectors to be added in each iteration. Can depend on the number of the current iteration i and current number of sampling points M: T(i, M). T ≥ 1hold, i.e., in each iteration at least one additional sample point is added. |

TABLE 1-continued

Exemplary parameters known at an encoder and a decoder.

| Parameter | Description |
| --- | --- |
| $C_0$ | Coordinates of initial sampling points corresponding to the initially transmitted motion vectors. Can be a predefined regular grid or signaled coordinates. |
| D(C) | Triangulation function. Computes a set of J triangles $\Theta = \{\theta_j\}$, with $0 < j \leq J$. A triangle $\theta$ contains the coordinates and values of the motion vectors at its corners. |
| S($\theta$) | Scoring function, assigning a score to the triangle $\theta$ that estimates how useful an additional sampling point inside the triangle would be. May additionally depend on variables known at the decoder, like values and positions of already transmitted motion vectors, the reference frame or the iteration number. |
| C($\theta$) | Function to compute coordinates of new sampling points inside the triangle $\theta$. May additionally depend on variables known at the decoder, like values and positions of already transmitted motion vectors, the reference frame or the iteration number. |
| G(v) | Function replicating encoding and decoding of the motion vector, including prediction, transformation, and/or quantization and dequantization. Especially for prediction, G (·)may additionally depend on variables known at the decoder, like values and positions of already transmitted motion vectors or the reference frame, or the iteration number. |

Figure 6:
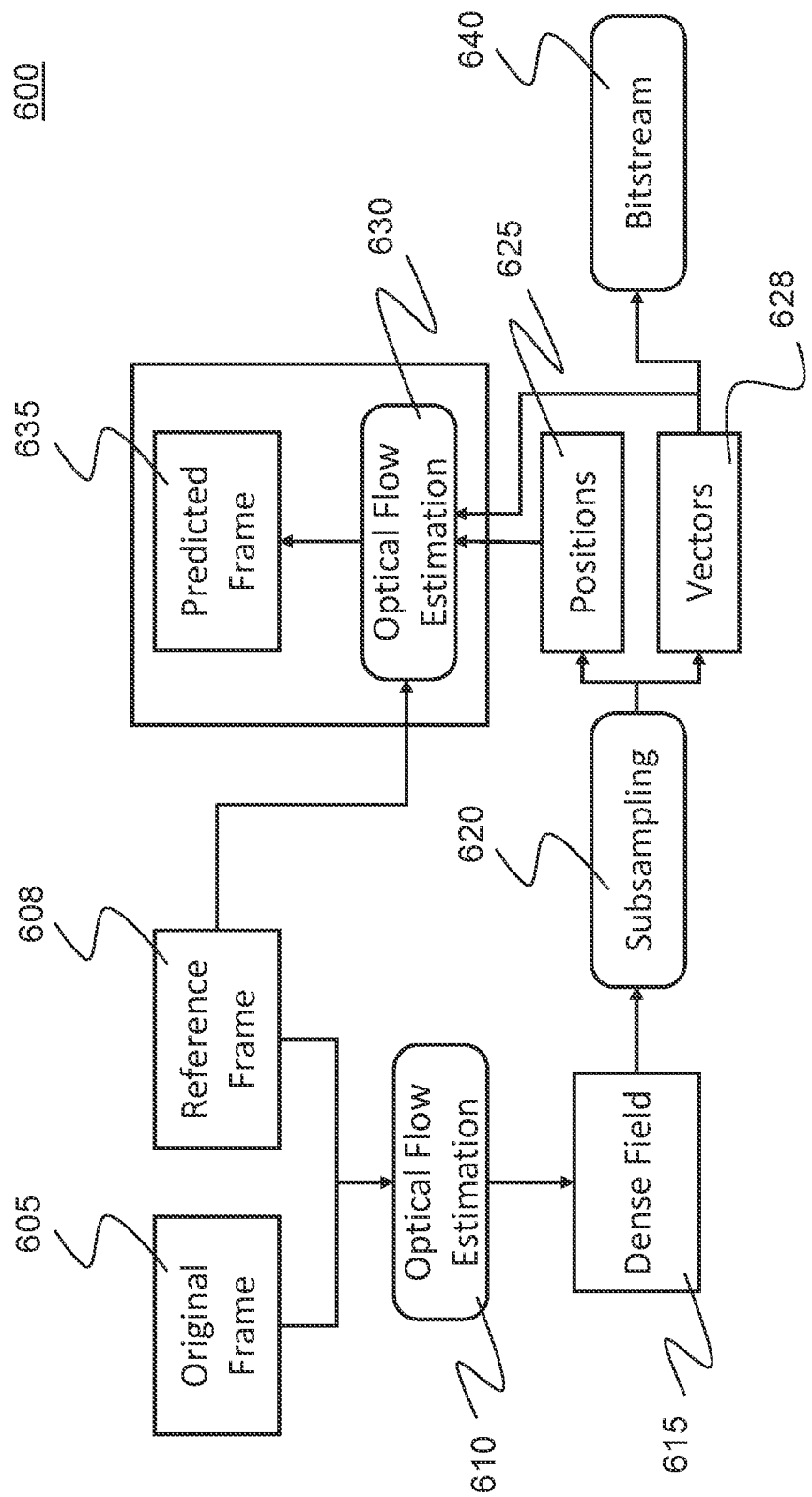
FIG. 6 is a bock diagram illustrating modules (units) of an encoder side which employ the determination of the sample positions by subsampling a dense motion vector field.

FIG. 6 shows an exemplary functional block diagram illustrating encoder side. The functional blocks of an apparatus 600 at the encoder include an optical flow estimation module 610, a subsampling module 620, a motion compensation module 630, and a bitstream generation 640.

In the following, let C be the (ordered) set of coordinates after the $i^{th}$ iteration. The corresponding set of motion vectors is denoted as $V_i$ respectively.

The encoder in this example subsamples the dense vector field, which was generated by an optical flow algorithm. Such algorithms are well known, one possible example may be found, e.g., in D. Pathak, R. Girshick, P. Dollar, T. Darrell, and B. Hariharan, "Learning features by watching objects move," in Proc. Conf. on Computer Vision and Pattern Recognition (CVPR), July 2017, pp. 6024-6033, in C. Liu, Beyond Pixels: Exploring New Representations and Applications for Motion Analysis, Ph.D. Thesis, Massachusetts Institute of Technology, Cambridge, 2009 or in P. Weinzaepfel, J. Revaud, Z. Harchaoui, and C. Schmid, "Deepflow: Large displacement optical flow with deep matching (ICCV)," in Proc. Intl. Conf. on Computer Vision, December 2013, pp. 1385-1392. The optical flow estimation module 310 uses as an input the original (current) frame 305 and a reference frame 308. The reference frame may be immediately preceding frame or another frame determined beforehand. It is not essential for the present disclosure, how the reference frame is determined. The result of the optical flow estimation 320 is a dense motion vector field 315, which forms an input to a subsampling module 320.

The subsampling scheme returns the sampling positions and sampled vectors, which are both needed for motion compensation to be performed by the encoder (for the purpose of predictive coding including reconstruction) and at the decoder (for the purpose of reconstruction). However, only the motion vectors are transmitted over the channel and written into the bitstream. It is noted that transmission over the channel may mean transmission over a network channel transmission to a storage. In any case, the encoder generates a bitstream into which the motion vectors are written, whereas the decoder parses the bitstream and reconstructs based thereon the encoded image (video).

The encoder may use the following iterative procedure to sub-sample the dense motion field (in general any motion field):

1. Start with a predefined coarse sampling pattern $C_0$ of K sampling points and transmit the motion vectors. Set i=0. (Example of K sampling points are the four sampling points in FIG. 3 (a), the pattern corresponds to the four corners of the rectangle. Here, i is the index going over iterations and starting from 0, corresponding to index k described above which started from 1.) It is noted that transmission of the motion vectors corresponding to K sampling points might be optional. In one example, both encoder and decoder can obtain the initial motion vectors corresponding to K sampling points based on motion vectors of the previously coded/decoded reference pictures. The present disclosure does not depend on the specific method of obtaining the motion vectors of the K initial sampling points.
2. Generate a triangulation $\Theta_i$ of all available sampling points $C_i$ using the deterministic function $D(C_i)$. (Corresponds to FIG. 3 (b) or 4 (a).)
3. Compute a score $s_j=S(\theta_j)$ for each triangle $\theta_j \in \Theta_i$ estimating how useful an additional sampling point within the triangle would be. (Corresponds to FIGS. 3 (c) and 4 (b).)
4. Determine the value of T. Pick the T triangles with the highest score in descending order to form the (ordered) subset $\hat{\theta}_i$. If two triangles have the same score, order them according to an arbitrary but fixed criterion, like preferring triangles closer to the upper left corner.
5. Determine the sampling points $C(\theta_j)$ in the center of the triangles $\theta_j \in \hat{\Theta}_i$. Add the sampling points to $C_i$ to obtain $C_{i+1}$. Sample the dense field to obtain the motion vectors at the resulting positions. Compute $G(v_j)$ for each of the sampled motion vectors $v_j$ and add them to $V_i$ to obtain $V_{i+1}$. Transmit the newly added motion vectors in an exemplary order. Do not transmit the positions. (This corresponds to FIGS. 3 (d) and 4(c).)
6. If the stop criterion (rate, prediction quality, number of motion vectors, etc.) was not reached, increase i by one and repeat from step 2.

In step 5 of the above example, the new sampling points $C(\theta_j)$ are added to correspond to the center of the triangles $\theta_j$. This is just for example, in other implementations the new sampling points may be added corresponding to other points inside a triangle.

Instead of transmitting (e.g., inserting into the bitstream) the motion vectors after each iteration in a progressive and scalable way, it is also possible to collect the motion vectors during the procedure and transmitting all the motion vectors in the end.

Figure 7:
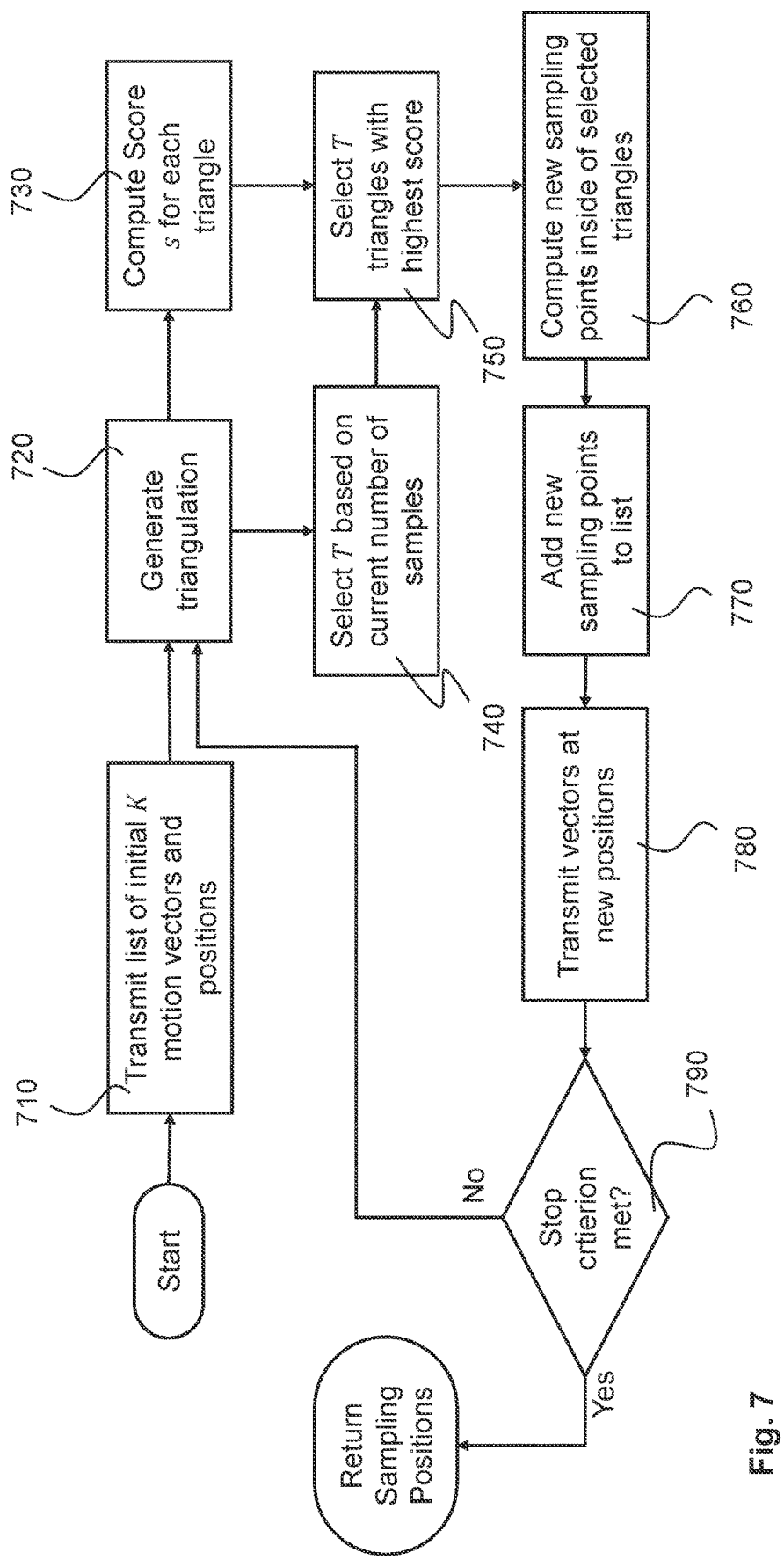
FIG. 7 is a flow chart illustrating a method for associating motion vectors and sample positions at an encoder side.

The subsampling procedure performed in subsampling module 320 is illustrated in a flow chart of FIG. 7 in detail. In particular, the procedure includes step 710 of obtaining the initial sample positions and the corresponding motion vectors and providing them for encoding into the bitstream (referred to more narrowly as "transmitting" in the figure). Step 710 corresponds to step 1 described above. The following step 720 represents triangulation (or updated triangulation) as in step 2 above. Step 730 performs score calculation, corresponding to above step 3. Step 740 selects the size of parameter T (if it is not fixed), corresponding to step 4 above, together with step 750, in which the T triangles with the highest score are selected. In step 760, the new points are calculated in the selected triangles and these new points are added to the sampling point list in step 770, both steps corresponding to step 5. Mentioned above. Step 780 provides the motion vectors associated with the sampling positions and step 790 tests the stop condition as discussed in step 6 above. In particular, step 780 derives the additional motion vectors to be inserted into the bitstream based on the sample positions which are derived according to the motion vectors included in the bitstream (e.g., according to which the triangle selection is performed).

Returning back to FIG. 6, after the subsampling 620 (or already during the subsampling depending on a particular implementation), the derived initial as well as additional motion vectors 628 are provided to a bitstream generation module 640 for generating information which may be used for the reconstruction of these motion vectors 628 at the decoder. Moreover, the derived sample positions 625 together with the motion vectors 628 are provided to the motion compensation module 630. The motion compensation module 630 also receives the reference frame 608 and determines the predicted frame 635.

The motion compensation 630 operates in the same way as at the decoder side, i.e., uses only information, which will also be available at the decoder to generate the predicted frame. This includes reconstruction of the motion vector field for all sample position of the image on the basis of the subsampled positions 625 and the associated motion vectors 328. Such reconstruction may be performed by interpolation according to any of the known approaches, such as bilinear or bicubic interpolation. It is noted that the particular way of reconstructing the motion vector field is not to limit the present disclosure and any reconstruction approach may be applied.

For example, a bilinear interpolation of a motion vector MV, wherein the MVx and MVy represent the horizontal and vertical components of the motion vector, could be performed as follows:

$$MVx = MV1x*a + MV2x*b$$

$$MVy = MV1y*a + MV2y*b,$$

where a and b are scalar values, and (MVx, MVy) and (MV2x, MV2y) represent the horizontal and vertical components of the two neighboring motion vectors.

As the name implies in bilinear interpolation the interpolated result is obtained as a weighted sum of 2 values.

Bilinear interpolation is given just as an example. The present disclosure is not limited to a specific method of obtaining the reconstructed motion vector field.

Figure 8:
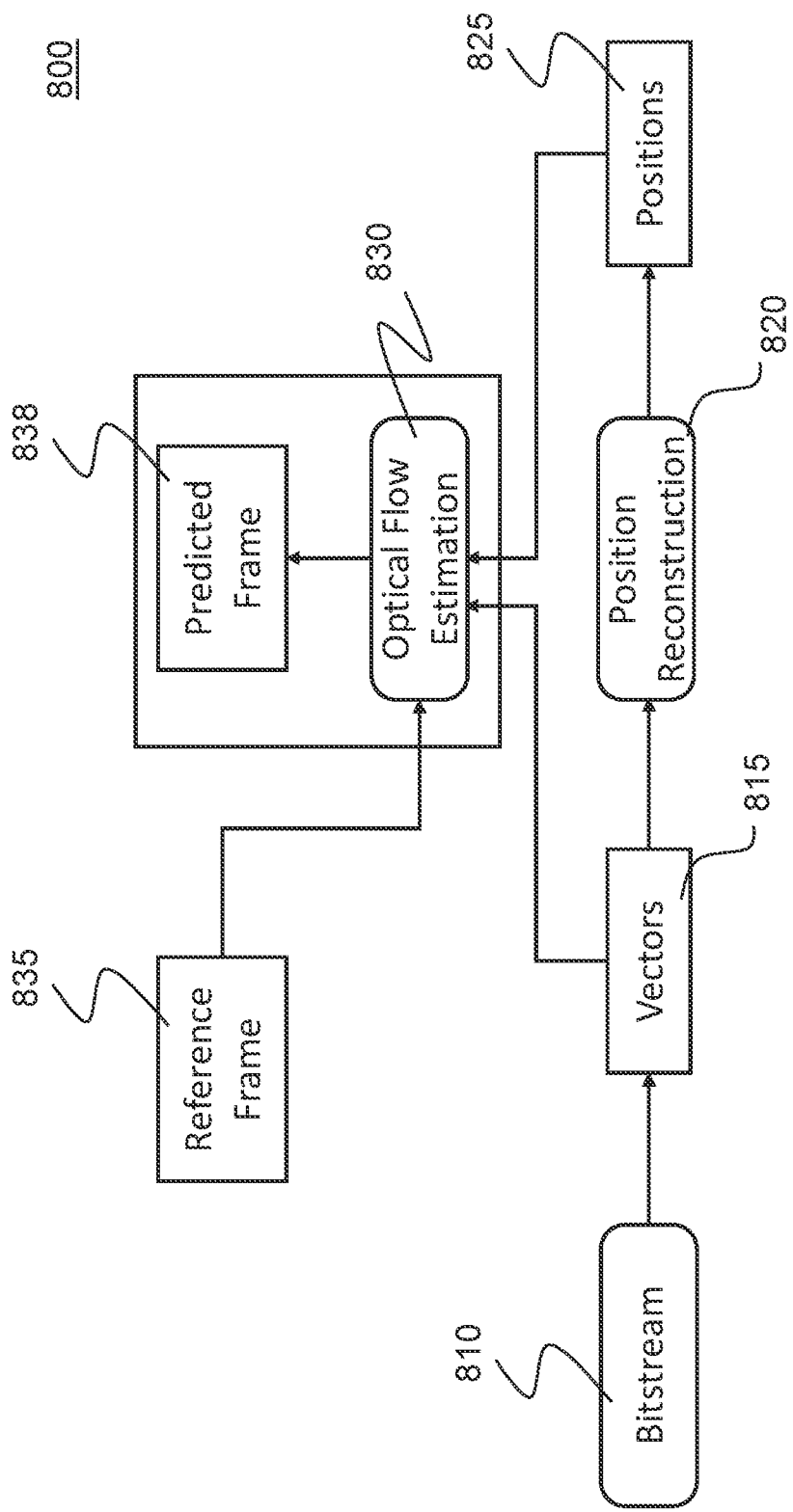
FIG. 8 is a block diagram illustrating modules (units) of a decoder side, which employ the determination of the sample positions by reconstructing the sample positions.

FIG. 8 illustrates modules and information used and generated by them at the decoder side.

In the decoder 800, the sampling positions are reconstructed. Having only the motion vectors is not sufficient for motion compensation. A bitstream parsing module 810 parses the bitstream which may be retrieved from a storage or received via any other interface, e.g., over a network. The parsing is performed, e.g., as in the well-known codecs based on the syntax and semantics of the bitstream defined in a standard. Among the parsed parameters, motion vectors 815 are included. These motion vectors are the same as motion vectors 628 included into the bitstream at the encoder 600. Then, the sample positions 825 associated with the motion vectors are derived in position reconstruction module 820. The parsed motion vectors 815, the derived sample positions 825 and a reference frame 835 are input to a motion estimation module 830 to generate a predicted frame 838. It is noted that the motion vectors 815 are not necessarily directly parsed from the bitstream. Rather, in general, information is parsed from the bit stream, which enables derivation of the motion vectors. This may be reference to a candidate list or some differential values, or the like. The motion compensation module 830 and the predicted frame 838 are included in a common frame in FIG. 8 in order to indicate that these blocks have the same functionality and may be implemented in the same manner at the encoder—corresponding to the motion compensation module 630 and the predicted frame 638 in FIG. 6. Thus, the predicted frames 838 and 635 should be the same so that the encoder and the decoder obtain the same prediction and can perform the reconstruction in the same manner as will be briefly described later.

The decoder 800 can reconstruct the positions of the resulting sequence of motion vectors with the following procedure performed in the position reconstruction module 820.

1. Start with a predefined coarse sampling pattern $C_0$ of K sampling points and transmit the motion vectors. Set i=0. (This corresponds, e.g., to FIG. 3, part (a).)
2. Generate a triangulation $\Theta_i$ of all available sampling points $C_i$ using the deterministic function $D(C_i)$. (This corresponds, e.g., to FIG. 3, part (b) or FIG. 4, part (a).)
3. Compute a score $s_j = S(\theta_j)$ for each triangle $\theta_j \epsilon \Theta_i$ estimating how useful an additional sampling point within the triangle would be. (This corresponds, e.g., to FIG. 3, part (c) or FIG. 4, part (b)).
4. Determine the value of T. Pick the T triangles with the highest score in descending order to form the (ordered) subset $\hat{\Theta}_i$. If two triangles have the same score, order them according to an arbitrary but fixed criterion, like preferring triangles closer to the upper left corner.
5. Determine the sampling points $C(\theta_j)$ in the center of the triangles $\theta_j \epsilon \hat{\Theta}_i$. Add the sampling points to $C_i$ to obtain $C_{i+1}$. Decode the motion vectors, including dequantization, back transformation, and prediction. Assign the received motion vectors to the resulting positions and add them to $V_i$ to obtain $V_{i+1}$. (This corresponds, e.g., to FIG. 3 (d) or FIG. 4 (c).)
6. If the end of the bitstream was not reached, increase i by one and repeat from the step 2 above.

This way, the decoder can construct the same sparse motion field as the encoder, on the basis of which the dense motion vector field can then be interpolated as already described above with reference to the encoder 600.

Figure 9:
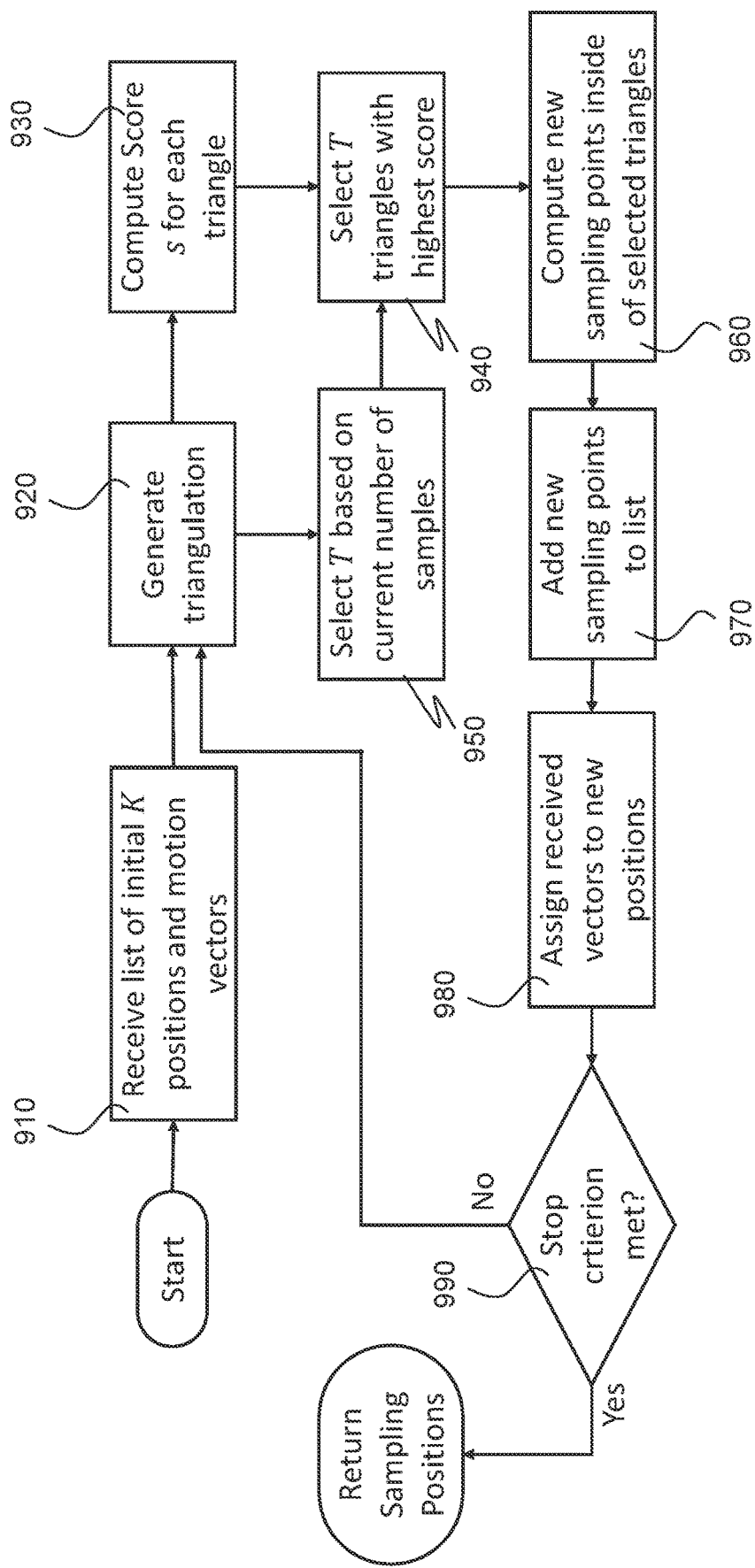
FIG. 9 is a flow chart illustrating a method for associating motion vectors and sample positions at a decoder side.

FIG. 9 shows a flow diagram illustrating the above mentioned steps. In particular, step 910 corresponds to step 1 and concerns obtaining the K initial motion vectors and respective positions. Step 920 generates triangulation in the same way as described with reference to the encoder, and corresponding to the above step 2. Step 930 calculates the scores (step 3) for the triangles, step 950 selects T, and step 940 selects the T triangles with the highest score (step 4). Step 960 computes the additional positions within the selected triangles while step 970 adds the additional positions to the list and step 980 associates them with the corresponding motion vectors (step 5). Step 990 tests the stop condition (step 6).

The following section provides a simple detailed example of the procedure at the decoder. In this example, the parameter T increases with the number of current sampling points (i.e., in iteration i sampling points of iteration i−1). The procedure starts with K=4 initial samples which are located in the corners of the image as shown in FIG. 3 (a). Afterwards, the triangulation of all four points is calculated, resulting in the two triangles (FIG. 3 (b)). Now, the score $s_j$ is computed for each triangle j of the triangles in iteration i, and the triangles are ordered according to the score as shown in FIG. 3 (c). Here, the lower triangle $\theta_2$ has corner motion vectors pointing in different directions, which suggests a change in motion somewhere inside the triangle. The upper triangle $\theta_1$ has corner motion vectors pointing in very similar directions, which suggests a rather homogeneous motion field inside. The score $s_2$ should therefore be larger than $s_1$. At this point, T is set to 1 and therefore only the triangle with the highest score is selected. A new sampling point is then calculated inside the triangle $\theta_2$. FIG. 3 (d) shows the motion vector at this position.

Since the stop criterion was not reached yet, a triangulation is repeated again, this time yielding 4 triangles $\theta_1 \ldots \theta_4$ (FIG. 4, part (a)). Again, scores are computed for each triangle. Here triangles $\theta_3$ and $\theta_4$ should have the highest score, since both other triangles have similar corner motion vectors (FIG. 4, part (b)). This time, T is set to 2 (increased with increasing number of current sample points—sample points at the beginning of the current iteration), so new points are inserted in $\theta_3$ and $\theta_4$ (FIG. 4, part (c)). FIG. 4 (d) shows the new triangulation. FIG. 5 shows the resulting transmission order, i.e., order of including the motion vectors into the bitstream) of the motion vectors. At first, all positions of the initial regular sampling are transmitted (numbers 1-4). Next, the motion vectors which were added in the first iteration (only number 5). Last, the motion vectors, which were added in the second iteration (numbers 6-7).

In an exemplary embodiment, K=100 initial motion vectors are provided, which are regularly distributed over the image. That way, no position information has to be transmitted. As triangulation function D(C), a Delaunay triangulation is applied, for example as implemented in the Qhull library (available at http://www.qhull.ora/).

In other words, the obtaining non-overlapping triangles is performed by Delaunay triangulation. The term triangulation in general refers to constructing triangles by connecting pairs of coordinates (sample positions) with lines, wherein the lines do not intersect each other and each corner of the (each) triangle corresponds to a sample position (subsampling coordinate). Other way round, each sample position associated with a motion vector (subsampling coordinate) is a corner of at least one triangle. The present disclosure is not limited to application of the Delaunay triangulation. Different triangulations are possible. Other triangulations may be faster in computation or even better in rate-distortion efficiency. Furthermore, an incremental implementation of the Delaunay triangulation is available, so the triangulation does not have to be computed anew in each iteration but rather be updated, which reduces computational complexity.

The score for each triangle is computed (calculated) from the estimated (i.e., sample) variances of the three (that is why summation index i goes from 1 to 3) corner motion vectors of $v_1$, $v_2$, $v_3$:

$$\sigma_{mv,2}^2 = \sigma_x^2 + \sigma_y^2 + \varepsilon,$$

with a small constant $\varepsilon$, $$\sigma_x^2 = \frac{\left(\sum_{i=1}^{3} v_{i,x}^2\right) - \left(\sum_{i=1}^{3} v_{i,x}\right)^2}{3},$$

and $$\sigma_y^2 = \frac{\left(\sum_{i=1}^{3} v_{i,y}^2\right) - \left(\sum_{i=1}^{3} v_{i,y}\right)^2}{3}.$$

It is noted that the above estimation of the variance can be implemented using alternative methods such as:

$$\sigma_x^2 = \frac{\sum_{i=1}^{3}\left(v_{i,x} - \left(\sum_{i=1}^{3} v_{i,x}\right)\right)^2}{P},$$

$$\sigma_y^2 = \frac{\sum_{i=1}^{3}\left(v_{i,y} - \left(\sum_{i=1}^{3} v_{i,y}\right)\right)^2}{P}$$

where P is a predefined scalar such as 3. In general variance can be understood as a term that described deviation or difference between different values. For example in the above equations one can replace the square operation with absolute values in order to reduce the computational complexity (since square operation requires multiplication and absolute value operation much simpler).

Additionally, the sample variance is weighted with the estimate of the area Ae of the triangle such that larger triangles are rather split than smaller triangles. If the new sampling point of the triangle C(θ) would fall into the already sampled set, the score is set to −∞, so the triangle is never sampled. This can happen for small triangles if C(θ) contains the rounding operator. The resulting formula is:

$$S(\theta) = \begin{cases} -\infty & \text{if } C(\theta) \in C_i \\ A_\theta \cdot \sigma_{mv,\theta}^2 & \text{else} \end{cases}$$

The rounded center of mass of the triangle is used here to compute the new sampling point inside the selected triangle. With $p_1, p_2, p_3$ as the coordinates of the triangle corners, we can write:

$$C(\theta) = \left\lfloor \frac{p_1 + p_2 + p_3}{3} \right\rfloor$$

where $\lfloor \cdot \rfloor$ rounds the elements of a vector to the nearest integer. Here, j-th position $p_j = (x_j, y_j)$ for each j={1, 2, 3}. In other words, $p_j$ are the three corner positions of the triangle.

In this example, each iteration, 5% of the number of previous sampling points is added, so that $$T = 0.05 \cdot M_i = 0.05 \cdot |C_i|.$$

The function G(v) has to be fitted to an exemplary transmission pipeline. In this exemplary implementation, the pipeline contains a motion vector prediction with $v_{pred}$ and a deadzone quantizer and dequantizer $Q_{\Delta,\beta}(v)$ with step size Δ and deadzone β. Here, $Q_{\Delta,\beta}(v)$ maps the motion vector v to its reconstructed value $\hat{v}$. As mentioned above, the 5% is only an example and the corresponding constant may be set differently.

Figure 10:
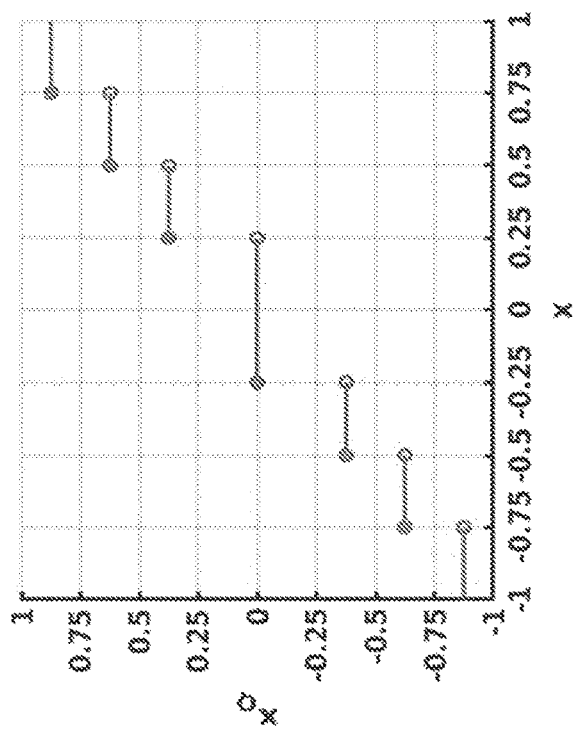
FIG. 10 is a graph illustrating an exemplary quantizer for motion vector coding.

FIG. 10 shows the exemplary function $Q_{\Delta,\beta}(v)$ for the values Δ=0.25 and β=0.25 which used in this exemplary implementation. Together with the motion vector prediction applied, the function G(v) can be expressed as follows:

$$G(v)=Q(v-v_{pred})+v_{pred}.$$

The prediction $v_{pred}$ of the motion vector v is computed as the barycentric mean of the corner motion vectors:

$$v_{pred}=w_1v_1+w_2v_2+w_3v_3.$$

wherein $w_{1...3}$ are the weights for barycentric interpolation of the new sampling point within the triangle. It is noted that the prediction error which is in this example signaled in the bitstream is calculated as:

$$e=v-v_{pred}.$$

Figure 11:
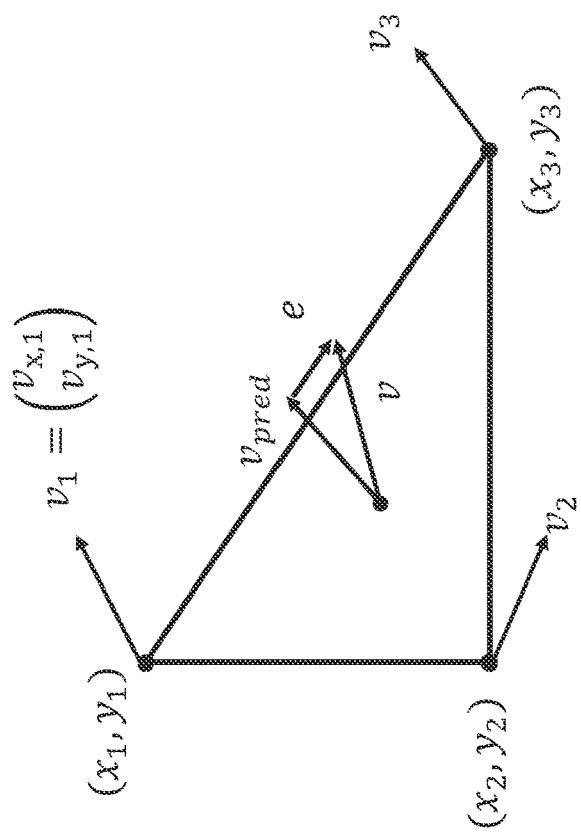
FIG. 11 is a schematic drawing illustrating an exemplary motion vector prediction.

Signaling prediction error rather than the motion vector itself may require less rate. The motion vector prediction is illustrated in FIG. 11. It is noted that the above-mentioned calculations are merely exemplary, and the present disclosure may also applied different calculations. For example, instead of the barycentric mean, median of the corner motion vectors may be used:

$$v_{pred}=\text{median}(v_1,v_2,v_3)$$

Multi-mode prediction is possible. For example, pick either $v_1$, $v_2$, $v_3$ or barycentric predictor, 2 bit side information to signal parameter m as a side information, and the predictor may be obtained as follows:

$$v_{pred}=P(x_1,y_1,x_2,y_2,x_3,y_3,v_1,v_2,v_3,f_{ref},m).$$

Wherein parameter m specifies one of the motion vectors $v_1$, $v_2$, $v_3$ on the respective coordinates $(x_1,y_1)$, $(x_2,y_2)$, $(x_3,y_3)$. In addition parameter m may indicate barycentric prediction (or other prediction). The specified motion vector prediction is used as a predictor. The three motion vectors and one additional predictor are advantageous as they represent four values which may be signaled with two bits. However, m may be signaled with a different number of bits and allow for signaling more or less predictors. Parameter m may also be signaled applying variable length codes.

Other predictors may be used for the newly sampled motion vectors. For instance, a position-based prediction which means that the motion vector located closest to the new sampling point serves as a predictor. The distance between the new point and each of the three vectors may be calculated, for instance as the Euclidian distance, or as a sum of absolute coordinate differences, or by applying any other metric. Then the motion vector among the three motion vectors which has the lowest distance, is selected as $v_{pred}$. Some test results indicate particularly good prediction results for the multi-mode approach and barycentric approach.

Still alternatively (or as a part of multi-mode predictor), the prediction function can be learned from a training set in a data-driven approach. For example machine learning and a corresponding non-linear function (such as neural network) may be applied.

Alternatively a list of motion vector predictors can be formed that include at least one of the motion vectors corresponding to the corners of the triangle, and an indicator can be obtained from the bitstream to indicate which one of the candidates in the list is used as motion vector predictor.

The additional motion vector may be obtained at the decoder (as well as at the encoder for the purpose of finding prediction frame including reconstruction of the motion vectors and the flow) by applying at least one of: dequantization, back transformation, and prediction. The prediction and dequantization have been described above. Back transformation correspond to signaling the vector or residual in a different coordinate system such as separated by magnitude and phase or a machine learning approach.

In the above-mentioned example, the score function S is calculated with by weighting the pre-computed $\sigma_{mv,2}^2=\sigma_x^2+\sigma_y^2+\varepsilon$. It is noted that parameter $\varepsilon$ does not need to be present. The weighting between the area and the variance can be changed, as well as the small constant $\varepsilon$. Also different functions are possible which estimate flow properties and come to a decision based on more abstract features. Also, a data-driven approach is possible, where the scoring function is learned from training data.

In the example above, the additional sample position is located in a center of mass of the triangle. However, in general, different positions within the triangle for the additional sampling points are possible. The reference picture or the motion field of the reference picture can be used to determine the position of the new sampling point inside the triangle. Also, the new position can be learned in a data-driven approach. Some further options may include other types of a triangle center among the well-known centers of triangles. It is possible to use the values of the motion vectors at the corners of the triangle to place the new sampling point at the position where new changes occur most likely.

In general, assuming the corner coordinates of a triangle are given by s1, s2, s3 and the motion vectors corresponding to the coordinates are given by mv1, mv2, mv3, and the motion vector that is parsed from the bitstream is mvNew, the coordinate of the new sampling point (sNew) might be calculated as a function of:

$$s\text{New}=f(s1,s2,s3,mv1,mv2,mv3,mv\text{New})$$

In the above function, some of the input arguments might be not used in order to reduce the computational burden.

Regarding the rate and quality control, number of motion vectors can be used as a stop criterion. This means that the iterations stop, as soon as the number of motion vectors derived for an image exceeds a predefined value (fixed, or derived according to a fixed rule from a quality parameter such as a quantization parameter, or signaled, or the like). Another possibility is to estimate (or even compute) the resulting rate and/or quality after each iteration and set a limit to the rate, a maximally desired quality or a rate-distortion-based stop criterion. The exact stop criterion will depend on the properties of the remaining components of a coder.

As mentioned above, the above mentioned methods and the corresponding apparatuses can be embedded within the well-known hybrid video encoders and decoders or within encoders and decoders applying artificial intelligence or one or more encoder/decoder stages.

According to an embodiment, a video encoder is provided for encoding an image of an image video sequence, comprising: an apparatus for providing motion vectors for the image, encoding circuitry for encoding the image based on the estimated motion vectors and for encoding information for deriving the estimated motion vectors, and a bitstream generator for generating the bitstream including the encoded image and the encoded information.

In particular, the apparatus may derive an optical flow for the image, based on the image and based on a reference image preceding or following the image in displaying order, derive information to be coded in the bitstream based on the derived optical flow, and encode the information into the bitstream.

Figure 12:
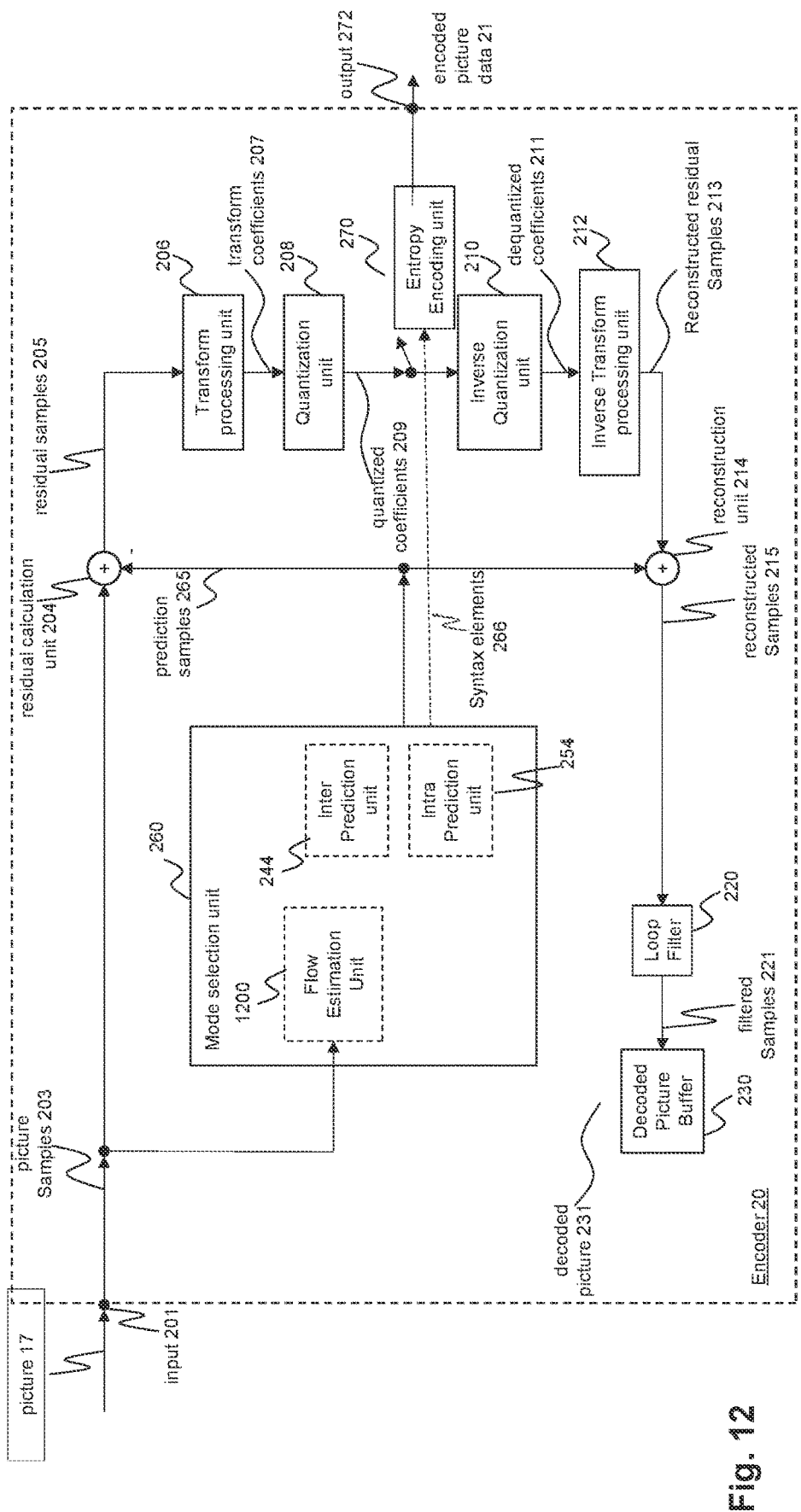
FIG. 12 is a block diagram showing an example of a video encoder configured to implement embodiments of the disclosure.

FIG. 12 illustrates an example of such embodiment. In particular, a flow estimation unit 1200 replaces motion estimation unit which used to provide motion vectors for the inter prediction in the state or the art codecs. Otherwise, the encoder and the encoding method are described briefly in the following. FIG. 12 shows a schematic block diagram of an example video encoder 20 that is configured to implement the techniques of the present application. In the example of FIG. 12, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254. Instead of a partitioning unit and a motion estimation part of the inter-prediction, the motion flow estimation 1200 is implemented. Inter prediction unit 244 performs prediction of the current frame based on the motion vectors (motion vector flow) determined in the motion flow estimation unit 1200.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

The encoder 20 may be configured to receive, e.g., via input 201, a picture 17 (or picture data 17), e.g., picture of a sequence of pictures forming a video or video sequence. The received picture or picture data may also be a pre-processed picture 1519 (or pre-processed picture data 1519). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e., the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e., the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in red, green, blue (RGB) format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Figure 2:
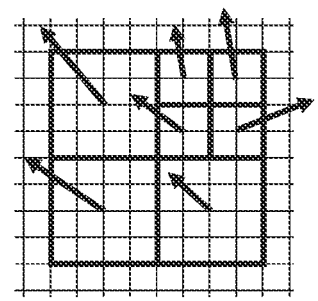
FIG. 2 is a schematic drawing illustrating motion estimation in a hierarchically split block.

Embodiments of the video encoder 20 as shown in FIG. 2 may be configured to encode the picture 17 block by block or per frame, e.g., the encoding and prediction may be performed per block 203. For example, the above mentioned triangulation may be performed for some bocks (rectangular or square parts of the image) separately. Moreover, intra prediction may work on a block basis, possibly including partitioning to blocks of different sizes.

Embodiments of the video encoder 20 as shown in FIG. 12 may be further configured to partition and/or encode the picture by using slices (also referred to as video slices), wherein a picture may be partitioned into or encoded using one or more slices (typically non-overlapping), and each slice may comprise one or more blocks. Slices are parts of the image which are not predicted using other slices of the same picture.

Embodiments of the video encoder 20 as shown in FIG. 12 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g., one or more blocks or one or more tiles, wherein each tile, e.g., may be of rectangular shape and may comprise one or more blocks (e.g., coding tree units (CTUs)), e.g., complete or fractional blocks which may be coded in parallel.

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain. The present disclosure may also apply other transformation which may be content-adaptive such as KLT, or the like.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Exemplary scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

A picture compression level is controlled by quantization parameter (QP) that may be fixed for the whole picture (e.g., by using a same quantization parameter value), or may have different quantization parameter values for different regions of the picture.

According to an embodiments, a video decoder is provided for decoding an image of an image video sequence, comprising: an apparatus for providing motion vectors for the image; the apparatus according to any of claims 1 to 14 for providing motion vectors for an image in the bitstream; circuitry applying a motion compensation according to the provided motion vectors to predict the image; an image of an image video sequence, comprising: an apparatus for providing motion vectors for the image; and circuitry for reconstructing the image based on the predicted image.

Figure 13:
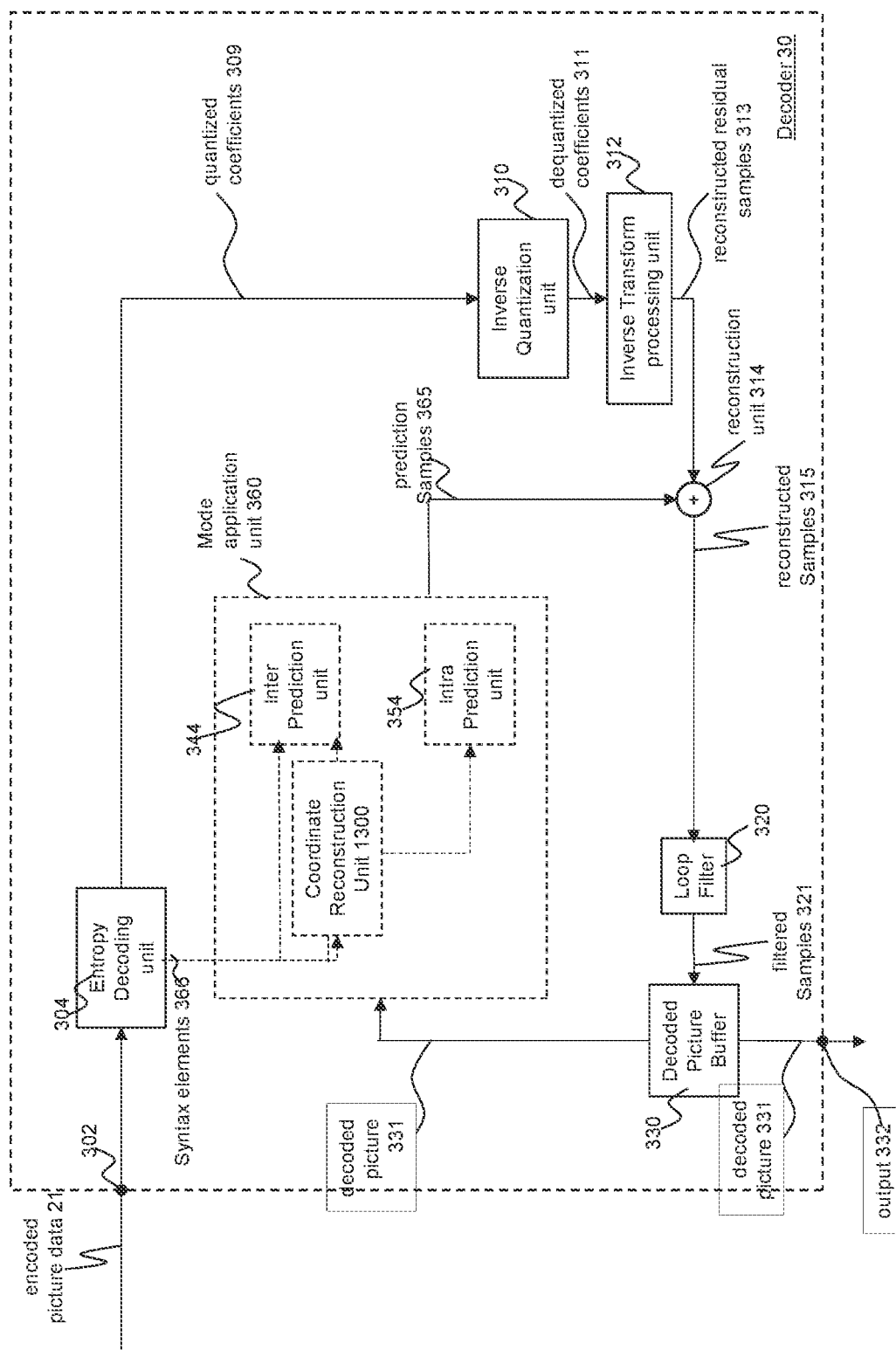
FIG. 13 is a block diagram showing an example structure of a video decoder configured to implement embodiments of the disclosure.

FIG. 13 illustrates an example of such embodiment of a decoder and the corresponding decoding method. In particular, a coordinate reconstruction unit 1300 is added to the decoder 30, for performing the optical flow reconstruction based on the derived sample positions and motion vectors. In particular, FIG. 13 shows an example of a video decoder 30 that is configured to implement the techniques of this present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice (and/or tile groups or tiles) and associated syntax elements.

In the example of FIG. 13, the decoder 30 comprises an entropy decoding unit 304, an inverse quantization unit 310, an inverse transform processing unit 312, a reconstruction unit 314 (e.g., a summer 314), a loop filter 320, a decoded picture buffer (DPB) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 12.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 13), e.g., any or all of inter prediction parameters (e.g., reference picture index and motion vectors or further parameters), intra prediction parameter (e.g., intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

The inter prediction unit 344 may be identical to the inter prediction unit 244 and the intra prediction unit 354 may be identical to the intra prediction unit 254 in function. The intra prediction unit 254 may perform split or partitioning of the picture and prediction based on the partitioning and/or prediction parameters or respective information received from the encoded picture data 21 (e.g., by parsing and/or decoding, e.g., by entropy decoding unit 304). Inter-prediction relies on the prediction obtained by reconstructing the motion vector field by the unit 1300. Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or generalized P or B slice (GPB slice)), construction information for one or more of the reference picture lists for the slice, motion vectors for each determined sample position associated with a motion vector and located in the slice, and other information to decode the video blocks in the current video slice. The same or similar may be applied for or by embodiments using tile groups (e.g., video tile groups) and/or tiles (e.g., video tiles) in addition or alternatively to slices (e.g., video slices), e.g., a video may be coded using I, P or B tile groups and/or tiles.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Figure 14:
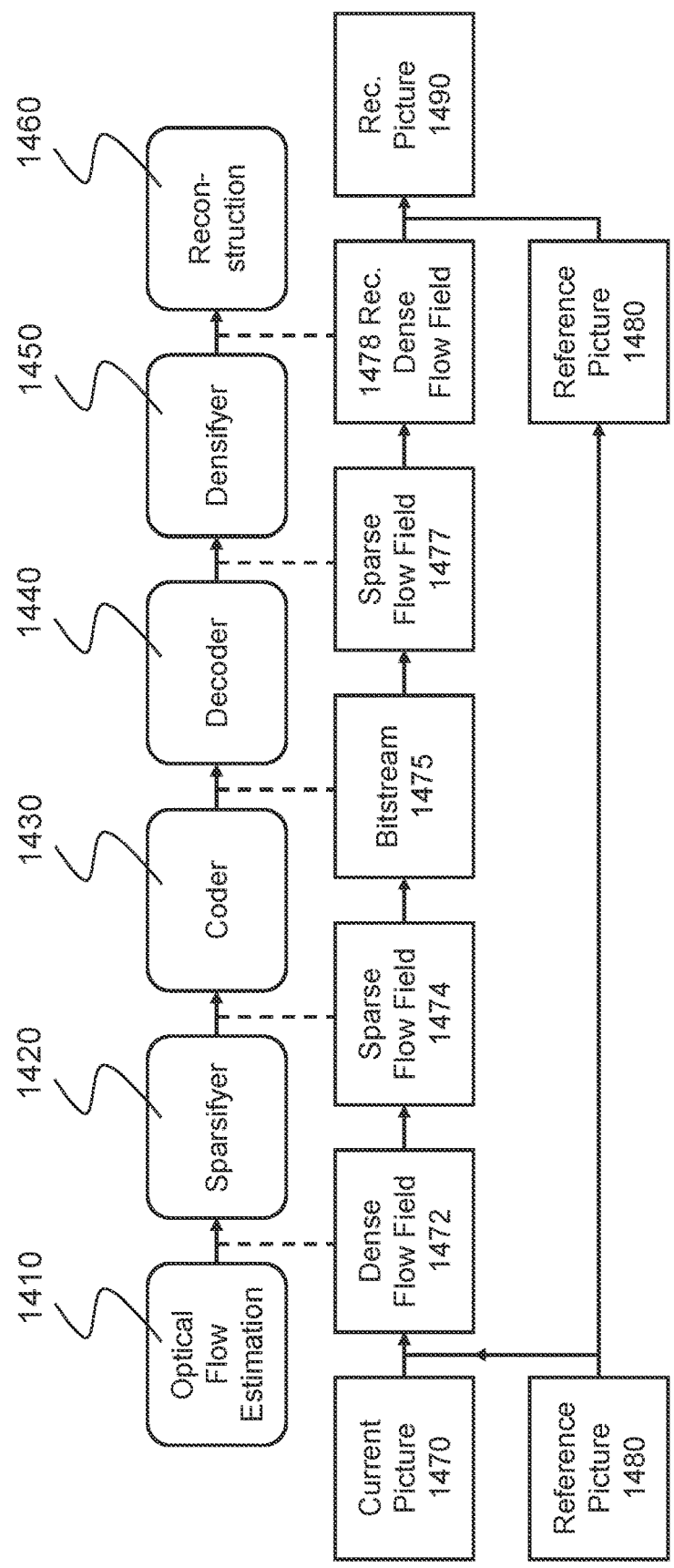
FIG. 14 is a flow diagram showing integration of the sample position determination and motion vector association into the encoding and decoding chain.

Moreover, the motion compensation employing the derivation of the sample positions as described above may be employed in a encoding and decoding chain illustrated in FIG. 14.

The encoding chain includes optical flow estimation 1410 which has as an input the current picture 1470 and the reference picture 1480. The optical flow estimation 1410 produces a dense flow field 1472 which is further processed by sparsifyer 1420 producing a sparse flow field 1474. The sparce flow field 1474 is entered to an encoder 1430 to generate bitstream 1475. The bitstream 1475 is decoded by a decoder 1440 including derivation of the sparse flow field 1477 which enters a densifier 1450 resulting in a reconstructed dense flow field 1478. The reconstructed dense flow field 1478 is used together with the reference picture 1480 to generate reconstructed picture 1490 at the reconstruction stage 1460.

Figure 15:
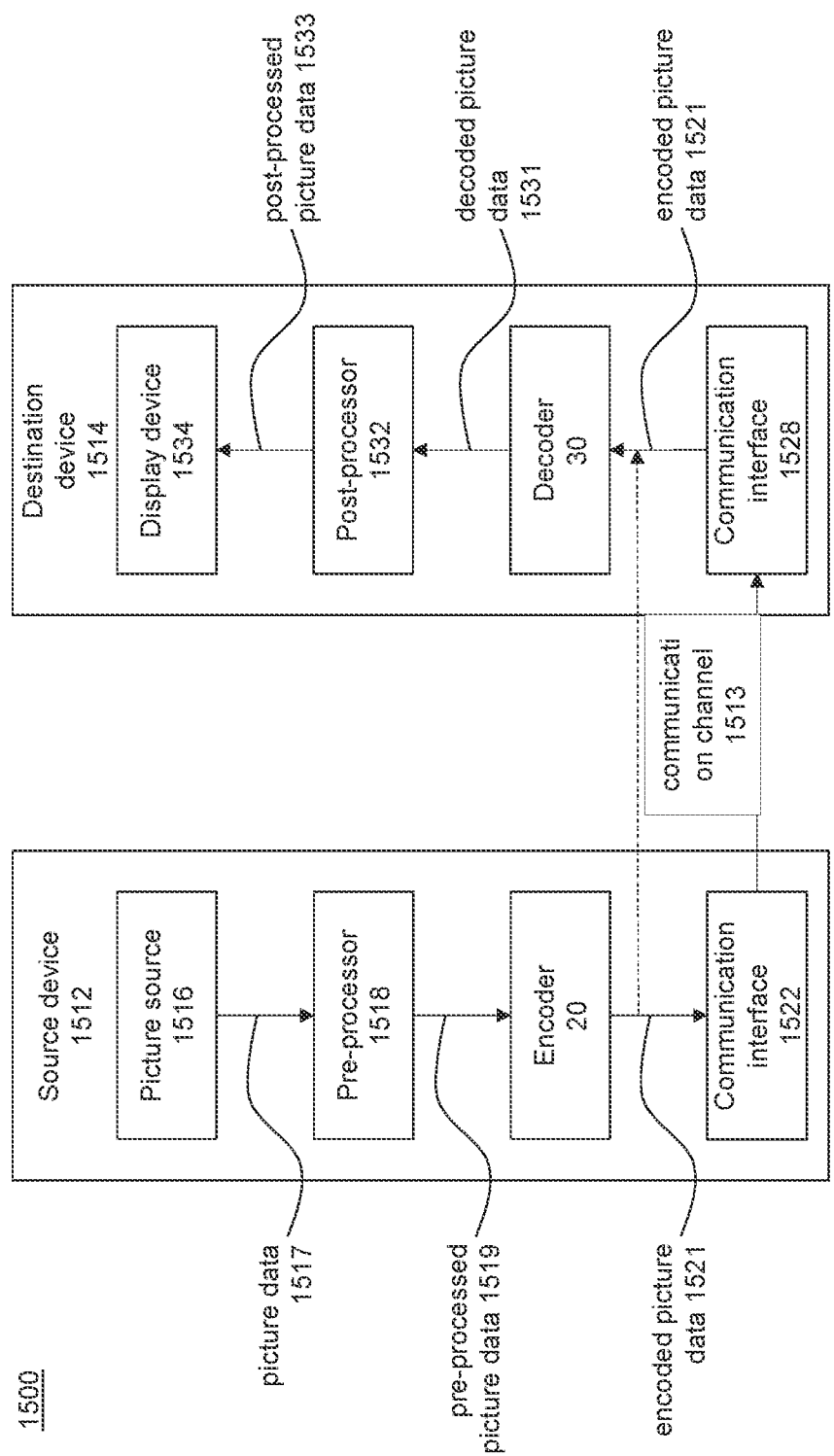
FIG. 15 is a block diagram showing an example of a video coding system configured to implement embodiments of the disclosure.

The corresponding system which may deploy the above-mentioned encoder-decoder processing chain is illustrated in FIG. 15. FIG. 15 is a schematic block diagram illustrating an example coding system 1500, e.g., a video coding system 1500 (or short coding system 1500) that may utilize techniques of this present application. Video encoder 20 (or short encoder 20) and video decoder 30 (or short decoder 30) of video coding system 1510 represent examples of devices that may be configured to perform techniques in accordance with various examples described in the present application.

As shown in FIG. 15, the coding system 1510 comprises a source device 1512 configured to provide encoded picture data 1521 e.g., to a destination device 1514 for decoding the encoded picture data 1513.

The source device 1512 comprises an encoder 20, and may additionally, i.e., optionally, comprise a picture source 1516, a pre-processor (or pre-processing unit) 1518, e.g., a picture pre-processor 1518, and a communication interface or communication unit 1522.

The picture source 1516 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 1518 and the processing performed by the pre-processing unit 18, the picture or picture data 1517 may also be referred to as raw picture or raw picture data 1517.

Pre-processor 1518 is configured to receive the (raw) picture data 1517 and to perform pre-processing on the picture data 1517 to obtain a pre-processed picture 1519 or pre-processed picture data 1519. Pre-processing performed by the pre-processor 1518 may, e.g., comprise trimming, color format conversion (e.g., from RGB to YCbCr), color correction, or de-noising. It can be understood that the pre-processing unit 1518 may be optional component.

The video encoder 20 is configured to receive the pre-processed picture data 1519 and provide encoded picture data 1521 (e.g., based on FIG. 12).

Communication interface 1522 of the source device 1512 may be configured to receive the encoded picture data 1521 and to transmit the encoded picture data 1521 (or any further processed version thereof) over communication channel 1513 to another device, e.g., the destination device 1514 or any other device, for storage or direct reconstruction.

The destination device 1514 comprises a decoder 30 (e.g., a video decoder 30), and may additionally, i.e., optionally, comprise a communication interface or communication unit 1528, a post-processor 1532 (or post-processing unit 1532) and a display device 1534.

The communication interface 1528 of the destination device 1514 is configured receive the encoded picture data 1521 (or any further processed version thereof), e.g., directly from the source device 1512 or from any other source, e.g., a storage device, e.g., an encoded picture data storage device, and provide the encoded picture data 1521 to the decoder 30.

The communication interface 1522 and the communication interface 1528 may be configured to transmit or receive the encoded picture data 1521 or encoded data 1513 via a direct communication link between the source device 1512 and the destination device 1514, e.g., a direct wired or wireless connection, or via any kind of network, e.g., a wired or wireless network or any combination thereof, or any kind of private and public network, or any kind of combination thereof.

The communication interface 1522 may be, e.g., configured to package the encoded picture data 1521 into an appropriate format, e.g., packets, and/or process the encoded picture data using any kind of transmission encoding or processing for transmission over a communication link or communication network.

The communication interface 1528, forming the counterpart of the communication interface 1522, may be, e.g., configured to receive the transmitted data and process the transmission data using any kind of corresponding transmission decoding or processing and/or de-packaging to obtain the encoded picture data 1521.

Both, communication interface 1522 and communication interface 1528 may be configured as unidirectional communication interfaces as indicated by the arrow for the communication channel 1513 in FIG. 15 pointing from the source device 1512 to the destination device 1514, or bi-directional communication interfaces, and may be configured, e.g., to send and receive messages, e.g., to set up a connection, to acknowledge and exchange any other information related to the communication link and/or data transmission, e.g., encoded picture data transmission. The decoder 30 is configured to receive the encoded picture data 1521 and provide decoded picture data 1531 or a decoded picture 31 (e.g., based on FIG. 13).

The post-processor 1532 of destination device 1514 is configured to post-process the decoded picture data 1531 (also called reconstructed picture data), e.g., the decoded picture 1531, to obtain post-processed picture data 1533, e.g., a post-processed picture 1533. The post-processing performed by the post-processing unit 1532 may comprise, e.g., color format conversion (e.g., from YCbCr to RGB), color correction, trimming, or re-sampling, or any other processing, e.g., for preparing the decoded picture data 1531 for display, e.g., by display device 1534.

The display device 1534 of the destination device 1514 is configured to receive the post-processed picture data 1533 for displaying the picture, e.g., to a user or viewer. The display device 1534 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 15 depicts the source device 1512 and the destination device 1514 as separate devices, embodiments of devices may also comprise both or both functionalities, the source device 1512 or corresponding functionality and the destination device 1514 or corresponding functionality. In such embodiments the source device 1512 or corresponding functionality and the destination device 1514 or corresponding functionality may be implemented using the same hardware and/or software or by separate hardware and/or software or any combination thereof.

As will be apparent for the skilled person based on the description, the existence and (exact) split of functionalities of the different units or functionalities within the source device 1512 and/or destination device 1514 as shown in FIG. 15 may vary depending on the actual device and application.

Figure 16:
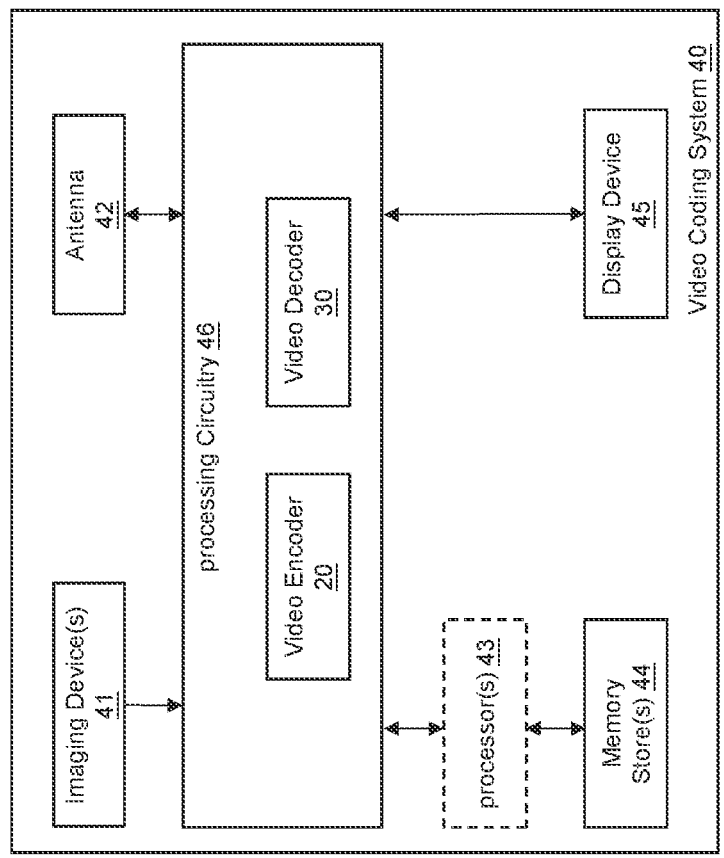
FIG. 16 is a block diagram showing another example of a video coding system configured to implement embodiments of the disclosure.

The encoder 20 (e.g., a video encoder 20) or the decoder 30 (e.g., a video decoder 30) or both encoder 20 and decoder 30 may be implemented via processing circuitry as shown in FIG. 16, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 12 and/or any other encoder system or subsystem described herein. The decoder 30 may be implemented via processing circuitry 46 to embody the various modules as discussed with respect to decoder 30 of FIG. 13 and/or any other decoder system or subsystem described herein. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 16.

Source device 1512 and destination device 1514 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system. In some cases, the source device 1512 and the destination device 1514 may be equipped for wireless communication. Thus, the source device 1512 and the destination device 1514 may be wireless communication devices.

In some cases, video coding system 1500 illustrated in FIG. 15 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC but rather aimed at their next generations and/or any other codecs.

Figure 17:
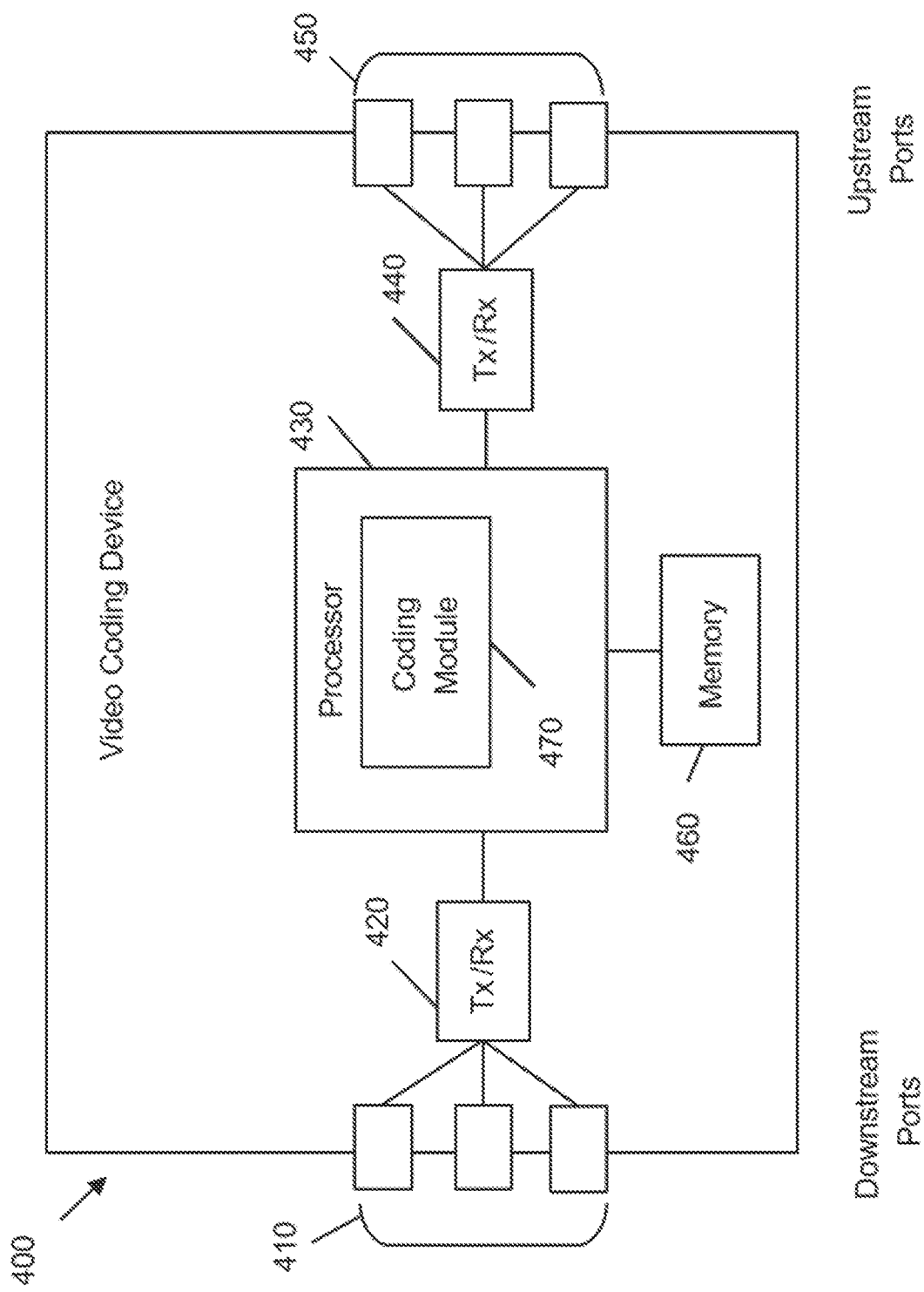
FIG. 17 is a block diagram illustrating an example of an encoding apparatus or a decoding apparatus.

FIG. 17 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 15 or an encoder such as video encoder 20 of FIG. 15.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 18:
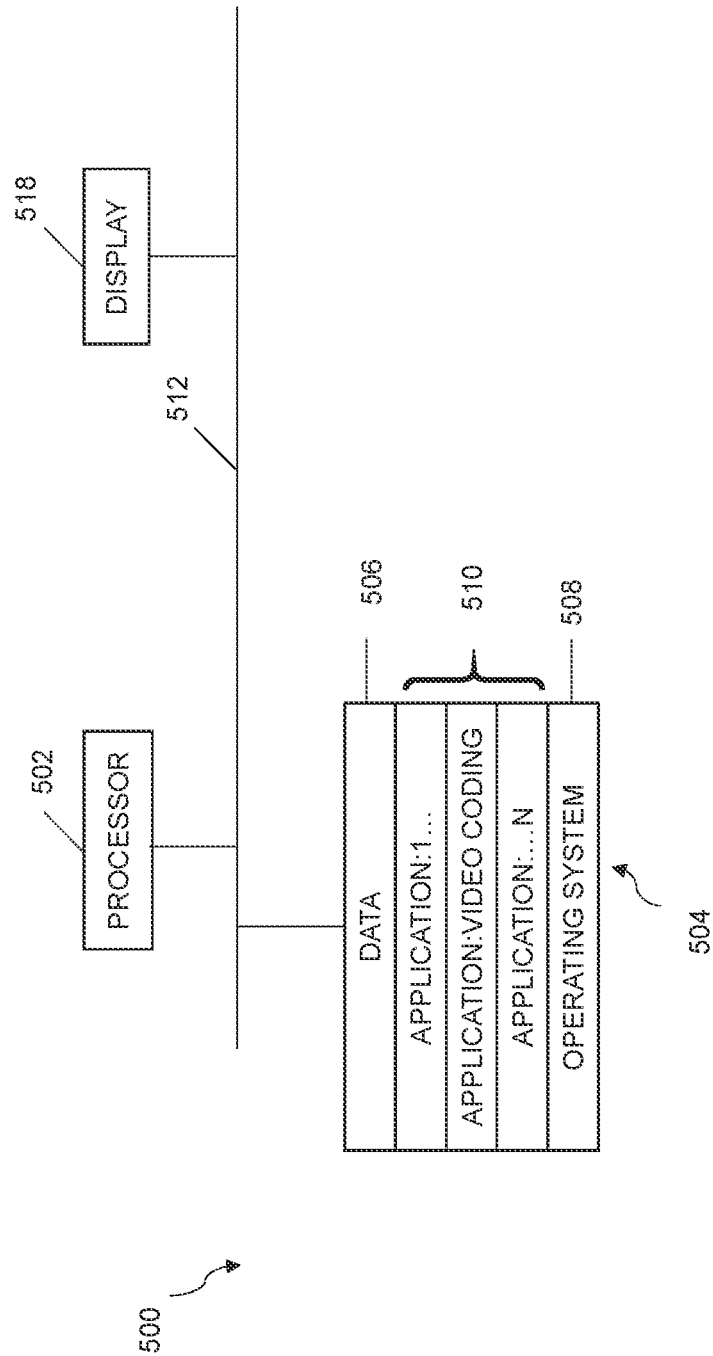
FIG. 18 is a block diagram illustrating another example of an encoding apparatus or a decoding apparatus.

FIG. 18 is a simplified block diagram of an apparatus 500 that may be used as either or both of the source device 1512 and the destination device 1514 from FIG. 15 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Summarizing, the present disclosure relates to determining of motion vectors for encoding or decoding of images. The motion vectors are associated with a set of respective corresponding sample position within an image. The motion vectors are obtained based on information conveyed in a bitstream. A sample position associated with one obtained motion vector is determined to be located within a triangle, which is formed by three sample positions of an obtained set of sample positions, the three sample positions being selected based on the respective motion vectors associated with the three sample positions, the triangle not including any other sample position of the set.

What is claimed is:

1. An apparatus for providing a plurality of motion vectors related to an image coded in a bitstream, comprising processing circuitry configured to:
obtain a set of sample positions within the image in a reference frame, and obtain respective motion vectors associated with the set of sample positions;
derive an additional motion vector based on information coded in the bitstream;
determine an additional sample position within the image in the reference frame, the additional sample position being located within a triangle, which is formed by three sample positions of the set of sample positions, based on the respective motion vectors associated with the three sample positions, the triangle not comprising the rest of the sample positions of the set of sample positions;
add the additional sample position to the set of sample positions; and
associate the derived additional motion vector with the additional sample position.

2. The apparatus according to claim 1, wherein the processing circuitry is configured to select, from the set of sample positions, the three sample positions for determining the additional sample position according to the respective motion vectors associated with the three sample positions.

3. The apparatus according to claim 2, wherein the selecting comprises:
obtaining non-overlapping triangles, wherein each sample position of the set of sample positions corresponds to at least one of the non-overlapping triangles;
computing, for each of the obtained non-overlapping triangles, a value indicative of a dissimilarity between three motion vectors, which are associated with three respective sample positions of the set of sample positions and form the triangle; and
selecting, the three sample positions for determining the additional sample position, according to the computed values.

4. The apparatus according to claim 3, the selecting further comprising:
determining T triangles for which each computed value indicating a highest dissimilarity among the values computed for the obtained non-overlapping triangles, with T being an integer and larger than zero; and
for each triangle of the T triangles, performing the determining, the adding and the associating.

5. The apparatus according to claim 4, wherein
the parameter T depends on an amount of sample positions in the set of sample positions.

6. The apparatus according to claim 1, wherein the processing circuitry is configured to perform N steps, with N being an integer and larger than one, wherein a k-th step, with k being an integer, comprises:
obtaining a k-th set of sample positions within the image, and obtain respective motion vectors associated with the k-th set of sample positions;
deriving one or more additional motion vectors from the information coded in the bitstream; and
forming a (k+1)-th set of sample positions by:
determining one or more additional sample positions, each located within a respective triangle, which is formed by three sample positions of the k-th set of sample positions, according to the respective motion vectors associated with the three sample positions, the triangle not comprising the rest of the sample positions of the (k-th) set of sample positions;
adding the one or more additional sample positions to the k-th set of sample positions to form the (k+1)-th set of sample positions; and
associating the derived additional motion vectors with the respective additional sample positions.

7. The apparatus according to claim 6, wherein N is predefined and/or determined according to a predefined rule.

8. The apparatus according to claim 6, wherein
the processing circuitry is configured to obtain the 1st set of sample positions by initializing the 1st set of sample positions to include sample positions given by a predefined grid within the image.

9. The apparatus according to claim 3, wherein
obtaining the non-overlapping triangles is performed by Delaunay triangulation.

10. The apparatus according to claim 3, wherein
the value for each of the obtained non-overlapping triangles is computed as a function of:
   i) an estimated variance of at least one component of the motion vectors associated with the three sample positions forming the triangle; and/or
   ii) an estimated variance of the motion vectors associated with the three sample positions forming the triangle; and/or
   iii) a size of the triangle.

11. The apparatus according to claim 1, wherein
the processing circuitry is configured to derive the additional motion vector by applying at least one of:
dequantization;
back transformation; and
prediction.

12. The apparatus according to claim 1, wherein
the additional sample position is located in a center of mass of the triangle or a function of:
the values of the motion vectors associated with the three sample positions forming the triangle;
the relative positions of the corners of the triangle; or
a reference picture.

13. The apparatus according to claim 6, wherein
the processing circuitry is configured to derive, from the bitstream, the value of N.

14. The apparatus according to claim 1, wherein
the processing circuitry is configured to reconstruct an optical flow for sample positions within the image, which do not belong to the set of sample positions, based on the sample positions of the set of sample positions and the associated motion vectors.

15. The apparatus according to claim 1, wherein the processing circuitry is configured to:
   derive an optical flow for the image, based on the image and based on a reference image preceding or following the image in a displaying order;
   derive information to be coded in the bitstream based on the derived optical flow; and
   encode the information into the bitstream.

16. A video decoder, comprising:
an apparatus for providing a plurality of motion vectors related to an image coded in a bitstream;
a circuitry applying a motion compensation according to the plurality of motion vectors to predict the image; and
a circuitry for reconstructing the image based on the predicted image,
wherein the apparatus comprises a processing circuitry configured to:
obtain a set of sample positions within the image in a reference frame, and obtain respective motion vectors associated with the set of sample positions;
derive an additional motion vector based on information coded in the bitstream;
determine an additional sample position within the image in the reference frame, the additional sample position being located within a triangle, which is formed by three sample positions of the set of sample positions, based on the respective motion vectors associated with the three sample positions, the triangle not comprising the rest of the sample positions of the set of sample positions;
add the additional sample position to the set of sample positions; and
associate the derived additional motion vector with the additional sample position.

17. A video encoder, comprising:
the apparatus according to claim 1 for providing the plurality of motion vectors related to the image coded in the bitstream;
an encoding circuitry for encoding the image based on the provided plurality of motion vectors and for encoding information for deriving the provided plurality of motion vectors; and
a generating circuitry for generating the bitstream including the encoded image and the encoded information.

18. A method for providing a plurality of motion vectors related to an image coded in a bitstream by using a processing circuitry, comprising:
obtaining a set of sample positions within the image in a reference frame, and obtaining respective motion vectors associated with the set of sample positions;
deriving an additional motion vector based on information coded in the bitstream;
determining an additional sample position within the image in the reference frame, the additional sample position being located within a triangle, which is formed by three sample positions of the set of sample positions, based on the respective motion vectors associated with the three sample positions, the triangle not comprising the rest of the sample positions of the set of sample positions;
adding the additional sample position to the set of sample positions; and
associating the derived additional motion vector with the additional sample position.

19. The video decoder according to claim 16, further comprising:
reconstructing an optical flow for sample positions within the image, which do not belong to the set of sample positions, based on the sample positions of the set of sample positions and the associated motion vectors.

20. The video decoder according to claim 16, further comprising:
deriving an optical flow for the image, based on the image and based on a reference image preceding or following the image in a displaying order;
deriving information to be coded in the bitstream based on the derived optical flow; and encoding the information into the bitstream.

* * * * *